US007851408B2

(12) United States Patent
Ikuno et al.

(10) Patent No.: US 7,851,408 B2

(45) Date of Patent: Dec. 14, 2010

(54) INK ABSORBING PARTICLE, MATERIAL SET FOR RECORDING AND RECORDING APPARATUS

(75) Inventors: Masaya Ikuno, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 73 days.

(21) Appl. No.: 12/371,669

(22) Filed: Feb. 16, 2009

(65) Prior Publication Data

US 2010/0075843 A1 Mar. 25, 2010

(30) Foreign Application Priority Data

Sep. 25, 2008 (JP) ............................ 2008-246215

(51) Int. Cl.

| | |
|---|---|
| ***B01J 20/26*** | (2006.01) |
| ***B01J 20/00*** | (2006.01) |
| ***B01J 20/22*** | (2006.01) |
| *C08F 120/18* | (2006.01) |

(52) U.S. Cl. ....................... 502/402; 502/400; 502/401; 526/329.7

(58) Field of Classification Search ................. 502/400, 502/401, 402; 526/329.7

See application file for complete search history.

(56) References Cited

U.S. PATENT DOCUMENTS

2006/0286315 A1 12/2006 Hashimoto et al.

FOREIGN PATENT DOCUMENTS

| | | |
|---|---|---|
| JP | 2006-347085 | 12/2006 |
| JP | 2007-175978 | 7/2007 |
| JP | 2008-195077 | 8/2008 |

*Primary Examiner*—Timothy C Vanoy
*Assistant Examiner*—Daniel Berns
(74) *Attorney, Agent, or Firm*—Fildes & Outland, P.C.

(57) ABSTRACT

Ink absorbing particle to absorb an ink includes a polymer. The ink absorbing particles in a TMA needle penetration have a minimum temperature Ts10b of from about 80° C. to about 150° C. at which a needle enters to a depth of 10 μm, a minimum temperature Ts100w of about 40° C. or lower at which a needle enters to a depth of 100 μm when an equivalent amount of water is absorbed, and a minimum temperature Ts400w of about 50° C. or higher at which a needle enters to a depth of 400 μm when an equivalent amount of water is absorbed.

12 Claims, 5 Drawing Sheets

INK ABSORBING PARTICLE, MATERIAL SET FOR RECORDING AND RECORDING APPARATUS

CROSS-REFERENCE TO RELATED APPLICATIONS

This application is based on and claims priority under 35 USC 119 from Japanese Patent Application No. 2008-246215 filed on Sep. 25, 2008.

BACKGROUND

1. Technical Field

The present invention relates to an ink absorbing particle, a material set for recording and a recording apparatus.

2. Related Art

As a recording method using ink, a method including applying ink droplets onto an intermediate transfer member on which ink absorbing particles have been applied, and transferring them to a recording medium has been proposed, in order to carry out recording on various recording media such as permeable media and impermeable media.

SUMMARY

According to an aspect of the invention, there is provided an ink absorbing particle to absorb an ink including a polymer, and the ink absorbing particles in a TMA needle penetration having a minimum temperature Ts10b of from about 80° C. to about 150° C. at which a needle enters to a depth of 10 μm, a minimum temperature Ts100w of about 40° C. or lower at which a needle enters to a depth of 100 μm when an equivalent amount of water is absorbed, and a minimum temperature Ts400w of about 50° C. or higher at which a needle enters to a depth of 400 μm when an equivalent amount of water is absorbed.

BRIEF DESCRIPTION OF THE DRAWINGS

Exemplary embodiments of the present invention will be described in detail based on the following figures, wherein.

DETAILED DESCRIPTION

Figure 1:
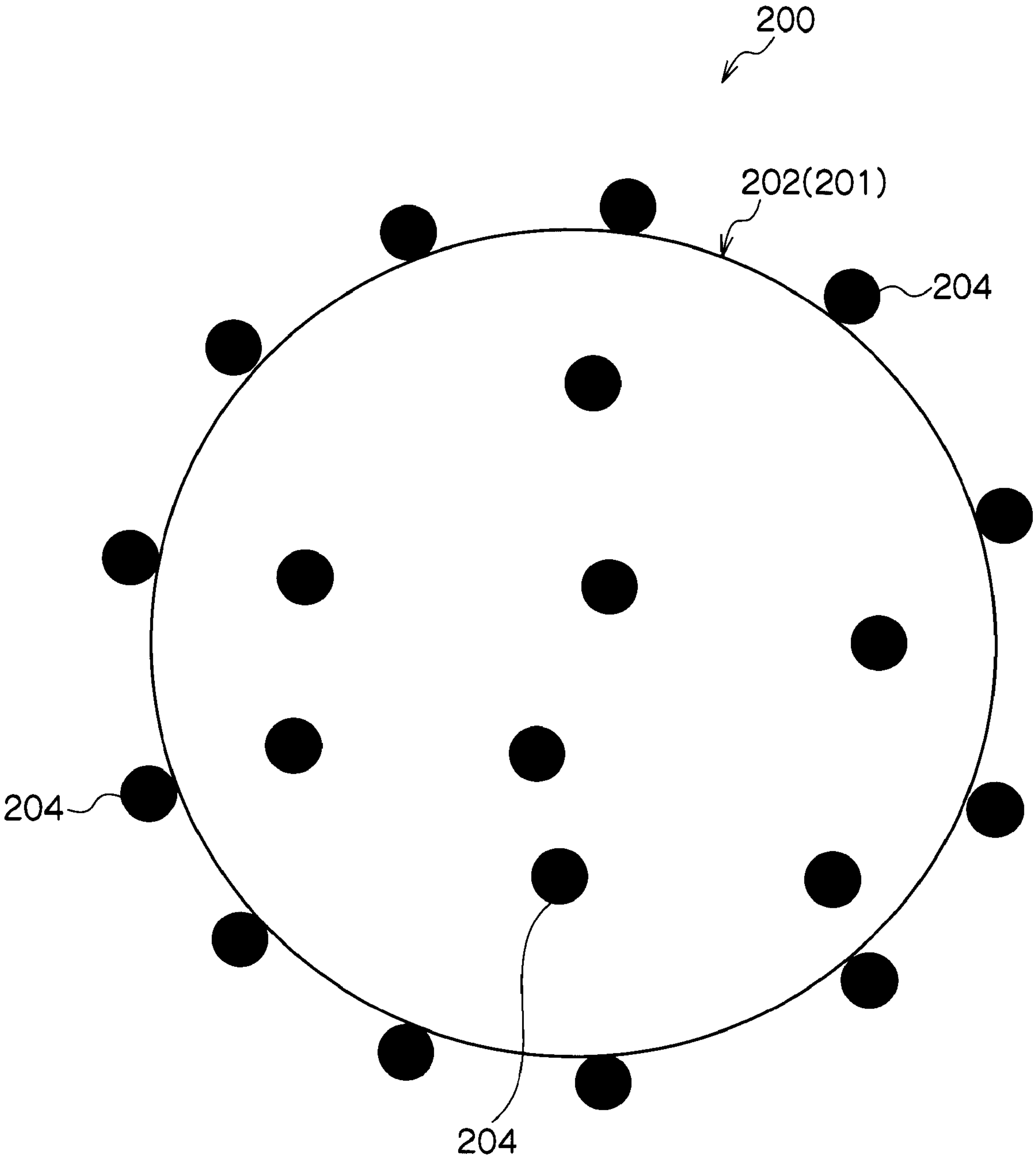
FIG. 1 is a conceptual diagram illustrating an example of an ink absorbing particle according to an exemplary embodiment of the invention.

Hereinafter, exemplary embodiments of the invention will be described in detail.

First Exemplary Embodiment

Ink Absorbing Particle

An ink absorbing particle according to the first exemplary embodiment has a minimum temperature Ts10b (hereinafter simply referred to as "softening temperature Ts10b"), at which a needle enters to a depth of 10 μm by a TMA needle penetration method, of from 80° C. to 150° C. (or from about 80° C. to about 150° C.), a minimum temperature Ts100w (hereinafter simply referred to as "softening temperature Ts100w"), at which a needle enters to a depth of 100 μm by a TMA needle penetration method when the ink absorbing particle absorbs an equivalent amount of water, of 40° C. or lower (or about 40° C. or lower), and a minimum temperature Ts400w (hereinafter simply referred to as "softening temperature Ts400w"), at which a needle enters to a depth of 400 μm by a TMA needle penetration method when the ink absorbing particle absorbs an equivalent amount of water, of 50° C. or higher, (or about 50° C. or higher), and can absorb an ink.

The inventors have found out that generation of unevenness of an image may be suppressed by regulating a softening temperature of an ink absorbing particle when a liquid component of ink is absorbed. Specifically, fixability may be improved and generation of unevenness of an image may be suppressed by regulating the softening temperature Ts10b measured by a TMA needle penetration method and also regulating the softening temperatures Ts100w and Ts400w measured by a TMA needle penetration method when an equivalent amount of water is absorbed, which are considered to represent softening temperatures of an ink absorbing particle when a liquid component of ink is absorbed.

Minimum Temperature Ts10b at Which a Needle Enters to a Depth of 10 μm by a TMA Needle Penetration Method:

The softening temperature Ts10b of an ink absorbing particle according to the first exemplary embodiment refers to a softening temperature Ts10b of the ink absorbing particle not absorbing liquid such as water. When the softening temperature Ts10b of the ink absorbing particle is less than 80° C., the transferability may be deteriorated since the ink absorbing particle is excessively softened, whereby unevenness of an image after fixing may be generated. When the softening temperature Ts10b of the ink absorbing particle exceeds 150° C., the transferability may be deteriorated since sufficient adhesiveness of the ink absorbing particle is not obtained, whereby unevenness of an image after fixing may be generated.

Minimum Temperature Ts100w at Which a Needle Enters to a Depth of 100 μm by a TMA Needle Penetration Method when an Equivalent Amount of Water is Absorbed:

If the softening temperature Ts100w of the ink absorbing particle according to the first exemplary embodiment when the ink absorbing particle absorbs an equivalent amount of water exceeds 40° C., the transferability may be deteriorated since sufficient adhesiveness of the ink absorbing particle is not obtained, whereby unevenness of an image after fixing may be generated. In addition, since adhesiveness of the ink absorbing particle is low, an image after fixing may easily peel off.

The softening temperature Ts100w may be 30° C. or lower. The lower limit for measurement of the softening temperature Ts100w is the temperature at which water freezes (0° C.).

Minimum Temperature Ts400w at Which a Needle Enters to a Depth of 400 μm by a TMA Needle Penetration Method when an Equivalent Amount of Water is Absorbed:

If the softening temperature Ts400w of the ink absorbing particle according to the first exemplary embodiment when the ink absorbing particle absorbs an equivalent amount of water is less than 50° C., the transferability may be deteriorated since the ink absorbing particle is excessively softened, whereby unevenness of an image after fixing may be generated. In addition, since the ink absorbing particle is easily softened, a fixed image may easily dissolve upon application of pressure (pen off set) or blocking (cohesion) in a fixed image may easily occur.

The softening temperature Ts400w may be 60° C. or higher. The upper limit for measurement of the softening temperature Ts400w is 300° C., in the measuring apparatus described below.

Difference Between Softening Temperature Ts400w and Softening Temperature Ts100w:

In the ink absorbing particle according to the first exemplary embodiment, the difference between the "minimum temperature Ts400w at which a needle enters to a depth of 400 μm by a TMA needle penetration method when an equivalent amount of water is absorbed" and the "minimum temperature Ts100w at which a needle enters to a depth of 100 μm by a TMA needle penetration method when an equivalent amount of water is absorbed", that is (softening temperature Ts400w—softening temperature Ts100w), is 10° C. or higher (or about 10° C. or higher).

When the difference is less than 10° C., the latitude for fixing is limited, whereby fixing of the ink absorbing particle may be defective.

The difference (softening temperature Ts400w—softening temperature Ts100w) is more preferably 20° C. or more.

Minimum Temperature Ts10d at Which a Needle Enters to a Depth of 10 μm by a TMA Needle Penetration Method when an Equivalent Amount of Water is Absorbed, and then 70 Weight % of the Absorbed Water is Dried Off:

In the ink absorbing particle according to the first exemplary embodiment, the softening temperature Ts10d when an equivalent amount of water is absorbed, and then 70 weight % of the absorbed water is dried off is preferably 50° C. or higher (or about 50° C. or higher). When the softening temperature is 50° C. or higher, blocking (cohesion) in a fixed image may be suppressed, and the durability of the image may be improved.

The softening temperature Ts10d may be 60° C. or higher. The upper limit for measurement is 300° C. in the measuring apparatus described below.

TMA Needle Penetration Method

A TMA needle penetration method refers to a method of measuring a softening temperature, in which the manner in which a needle enters a sample is measured by increasing temperature at a fixed temperature increase rate under a fixed pressure. Numerical values obtained by the TMA needle penetration method and indicated in the present specification are measured using an EXSTAR6000 TMA/SS6000 (manufactured by Seiko Instruments Inc.) as a measuring apparatus. Specifically, a sample (of ink absorbing particles) is placed into an aluminum cup with a diameter of 5 mm and a height of 5 mm such that the height of the sample reaches 2 mm. Then, measurement is performed at a pressure of 10 gf (fixed) at a temperature increase rate of 5° C./min using an expansion/compression probe (3 mm in diameter, formed of quartz) as a needle.

In the present specification, the minimum temperature at which a needle enters to a depth of 10 μm according to a TMA needle penetration method is referred to as "Ts10", the minimum temperature at which a needle enters to a depth of 100 μm according to a TMA needle penetration method is referred to as "Ts100", and the minimum temperature at which a needle enters to a depth of 400 μm according to a TMA needle penetration method is referred to as "Ts400".

For measurement by a TMA needle penetration method when an equivalent amount of water is absorbed, an equivalent amount of water is dripped into a sample and mixed therewith so that the sample absorbs an equivalent amount of water, and the sample that has absorbed the water is placed into an aluminum cup and measured.

For measurement by a TMA needle penetration method when an equivalent amount of water is absorbed, and then 70 weight % of the absorbed water is dried off, a sample into which water has been absorbed as described above is placed into an aluminum cup, the resultant is dried in a drying machine (Vacuum Dryer VO-FR1, manufactured by As One Corp.) at 80° C. in order to dry off 70 weight % of the absorbed water, and then measured.

Hereinafter, materials for ink absorbing particle according to the first exemplary embodiment will be described in detail.

An ink absorbing particle in the first exemplary embodiment absorbs ink components when the particle contacts with ink. The term "ink absorbing" used herein means retaining at least part of the ink components (at least liquid components). Specifically, "ink absorbing" material can absorb liquid at an amount of from several weight % (about 5 weight %) to several hundred weight % (about 500 weight %), and preferably from about 5 weight % to about 100 weight %, with respect to the weight of the material.

The ink absorbing particle may be a single liquid-absorbing particle (hereinafter may be referred to as a "primary particle"), or may be a composite particle formed by aggregation of at least liquid-absorbing particles. The single liquid-absorbing particle or the composite particle formed by aggregation of at least liquid-absorbing particles is sometimes referred to as a "mother particle". Even though expressions "when the ink absorbing particle is a single liquid-absorbing particle" and "when the ink absorbing particle is a composite particle" are used below, presence of fine inorganic particles on the single liquid-absorbing particle or on the composite particle is permitted even when these expressions are used.

When the ink absorbing particle is a single liquid-absorbing particle, reception of ink by the ink absorbing particle involves absorption of at least a liquid component by the liquid-absorbing particle that occurs when the ink contacts the ink absorbing particle.

In this manner, the ink absorbing particle absorbs ink. The ink absorbing particle having absorbed the ink is transferred onto a recording medium, whereby recording is carried out.

In a case in which the ink absorbing particle is a composite particle formed by aggregation of at least liquid-absorbing particles, reception of ink by the ink absorbing particle occurs in the following manner. When the ink contacts the ink absorbing particle, at least a liquid component of the ink is first trapped by voids among the particles (at least liquid-absorbing particles) constituting the composite particle (hereinafter the voids among the particles is sometimes referred to as a "trap structure"). At this time, a colorant as one of the ink components adheres to the ink absorbing particle surface or is trapped by the trap structure. Then the ink liquid trapped in the voids is absorbed by the liquid-absorbing particles. In this manner, the ink absorbing particle absorbs ink. The ink absorbing particle which has absorbed the ink is transferred onto a recording medium, whereby recording is carried out.

Trapping of the ink components (liquid components or the colorant) by this trap structure is physical and/or chemical trapping by voids among particles (physical particle wall structure).

When the composite particle in which at least liquid-absorbing particles are aggregated is used, ink liquid components are trapped in voids among particles forming the composite particle (physical particle wall structure), and are also absorbed and retained by the liquid-absorbing particles.

After transfer of the ink absorbing particle, components in the liquid-absorbing particles included in the ink absorbing particle may also function as a binder polymer or a coating polymer for the colorant contained in the ink. In particular, a transparent polymer may be used as a component of the liquid-absorbing particles included in the ink absorbing particle.

In order to improve the fixing property (rubbing resistance) of ink (e.g. a pigment ink) containing a colorant in the form of dispersed particles or an insoluble component such as a pigment, a large amount of polymer needs to be added to the ink. However, when a large amount of polymer is added to the ink (including treatment liquids), the nozzle of an ink ejecting unit may clog, leading to decreased reliability. In this regard, in the first exemplary embodiment of the invention, a polymer component included in the ink absorbing particle may perform the function of the polymer improving the fixing property.

"Voids among particles included in the composite particle", namely the "trap structure", is a physical particle wall structure capable of trapping at least liquid. The size of the voids may be from 0.1 μm to 5 μm, and preferably from 0.3 μm to 1 μm, in terms of the maximum opening diameter. In particular, the size of voids may be large enough to trap a colorant, for example a pigment having a volume-average particle diameter of 100 nm. Smaller pores of maximum opening size of less than 50 nm may be present additionally. In addition, voids, capillaries, or the like may communicate with each other inside of the composite particle.

The void size may be determined by inputting a scanning electron microscope (SEM) image of the particle surface to an image analyzer, detecting voids by binary coding process, and analyzing the size and distribution of the voids.

The trap structure may trap not only a liquid component of the ink but also a colorant. When colorant, especially pigment, is trapped in the trap structure together with the ink liquid component, the colorant is retained and fixed within the ink absorbing particle without being unevenly distributed. The ink liquid component mainly includes an ink solvents and/or a dispersion medium (vehicle liquid).

As mentioned above, the ink absorbing particle according to the first exemplary embodiment may have a configuration in which a mother particle is a single liquid-absorbing particle or may have a configuration in which a mother particle is a composite particle formed by aggregation of at least liquid-absorbing particles.

In addition to the above-mentioned polymer, other components (for example, an inorganic material etc.) may be contained in the liquid-absorbing particle.

In the mother particle, inorganic particles may be adhered onto the surface of a liquid-absorbing particle or a composite particle.

Figure 2:
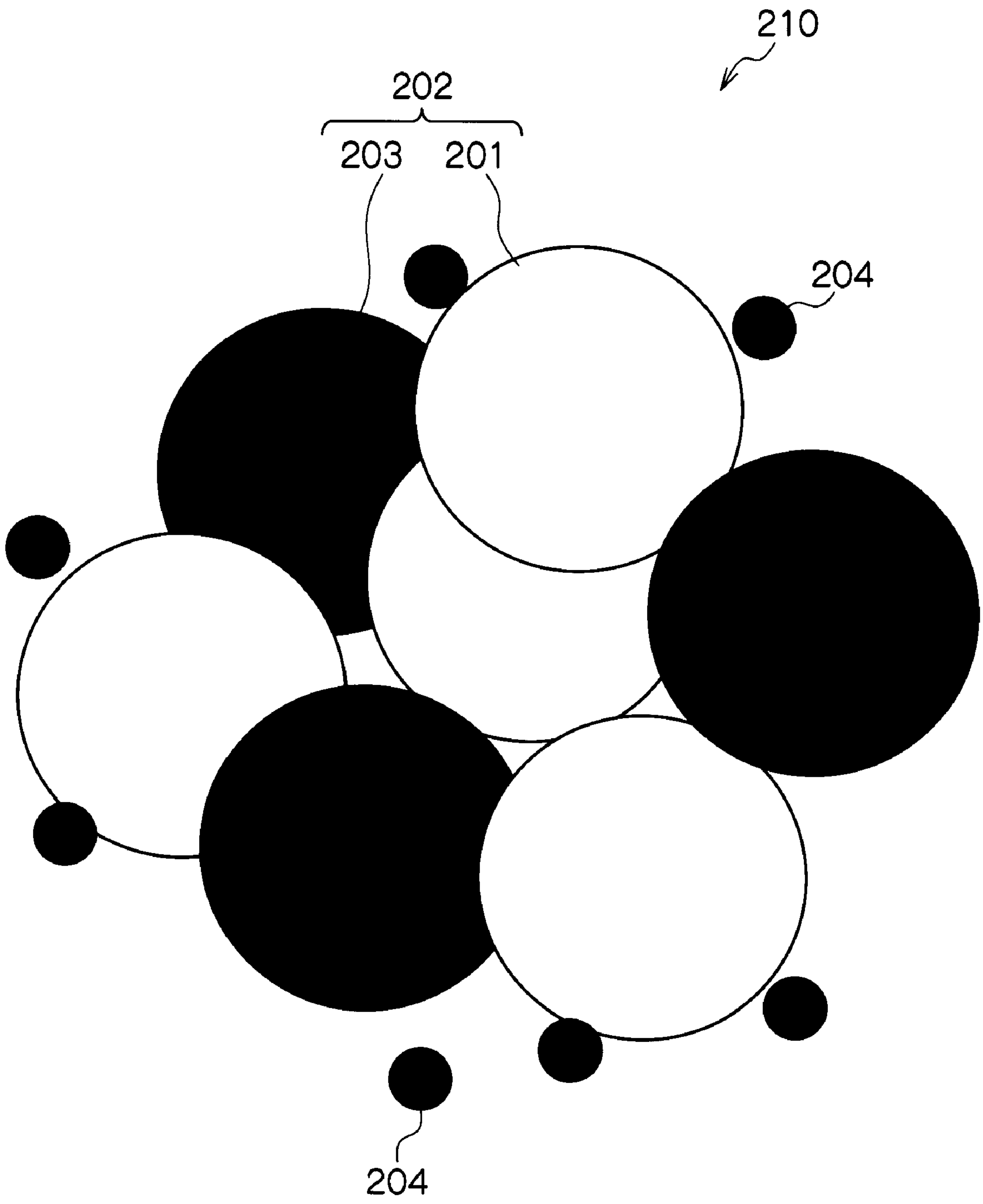
FIG. 2 is a conceptual diagram illustrating an example of an ink absorbing particle according to an exemplary embodiment of the invention.

The specific configuration of the ink absorbing particle according to the first exemplary embodiment may be, for example, any of the following:

a configuration in which an ink absorbing particle 200 containing a mother particle 202, which is a single liquid-absorbing particle 201, and inorganic particles 204 adhered to the surface of the mother particle 202 (liquid-absorbing particle 201), as shown in FIG. 1; or a configuration as shown in FIG. 2 in which an ink absorbing particle 210 containing a mother particle 202, which is a composite particle, and inorganic particles 204 which are adhered to the surface of the mother particle 202 (composite particle), wherein the composite particle is formed by a combination of first liquid-absorbing particles 201 and second liquid-absorbing particles 203. In the composite particle, a void structure is formed by voids among the respective particles within the composite particle.

When the mother particle is the composite particle, the BET specific surface area ($N_2$) may be from 1 $m^2/g$ to 750 $m^2/g$.

When the mother particle is a composite particle, the composite particle is obtained, for example, by granulating particles in a semi-coalesced state. The semi-coalesced state is a state in which the shape of each particle is maintained to a certain degree and voids among the particles are retained. The composite particle may be configured such that, when an ink liquid component is trapped in the trap structure, the composite particle partially breaks and some of the particles in the composite particle dissociate therefrom.

When composite particles are used as mother particles, the equivalent spherical diameter of the composite particles is preferably from 3 μm to 20 μm, and more preferably from 3 μm to 10 μm. In the case of liquid-absorbing particles each of which are itself a mother particle, the equivalent spherical diameter of the liquid-absorbing particles is preferably from 3 μm to 20 μm, and more preferably from 3 μm to 10 μm.

Here, the equivalent spherical diameter is a volume average particle diameter measured by HORIBA LA950 dry particle size distribution analyzer.

The ratio of the weight of the liquid-absorbing particles to the total weight of the ink absorbing particle is, for example, 75% or more, preferably 85% or more, and more preferably from 90% to 99%.

Next, the first liquid-absorbing particles and the second liquid-absorbing particles will be described in more detail.

As described above, in the ink absorbing particle according to the first embodiment, the ranges of the following (1) to (3) are adjusted to specific ranges:

(1) the softening temperature Ts10b;

(2) the softening temperature Ts100w when an equivalent amount of water is absorbed; and (3) the softening temperature Ts400w when an equivalent amount of water is absorbed.

In addition, it is preferable that the range of the following (4) is adjusted to a specific range:

(4) the softening temperature Ts10d when an equivalent amount of water is absorbed, and then 70 weight % of the absorbed water is dried off.

When the ink absorbing particle according to the first exemplary embodiment is a composite particle containing the first liquid-absorbing particles and the second liquid-absorbing particles as described above, the softening temperatures (1) to (4) are controlled by adjusting, for example, the molecular weights of polymers contained in the first and second liquid-absorbing particles, the concentrations of carboxylate in the polymers contained in the first and second liquid-absorbing particles, or the mixing ratios of the first and second liquid-absorbing particles. When the ink absorbing particle according to the first exemplary embodiment is a single liquid-absorbing particle, the softening temperatures (1) to (4) can also be controlled by adjusting, for example, the molecular weight of a polymer contained in the liquid-absorbing particle or the concentration of carboxylate in the polymer contained in the liquid-absorbing particle.

Molecular Weight of Polymer Contained in Liquid-Absorbing Particle

It is preferable that the first liquid-absorbing particles are particles containing a polymer (A) having a weight average molecular weight of 30,000 to 200,000 (or about 30,000 to about 200,000) and that the second liquid-absorbing particles are particles containing a polymer (B) having a weight average molecular weight is in a range of 10,000 to 50,000 (or about 10,000 to about 50,000) but having a lower weight average molecular weight than the polymer (A).

When the weight average molecular weights of the polymers contained in the first and the second liquid-absorbing particles are higher within the above ranges, the viscoelastic property tends to be improved due to the high molecular weights, which is preferable in terms of transferability and fixability. When the weight average molecular weights are lower within the above ranges, the viscosity after absorption of water tends to be low, which is preferable in terms of transferability and fixability.

When a single liquid-absorbing particle is itself a mother particle, it is preferable that the liquid-absorbing particle is a particle containing a polymer having a weight average molecular weight of 10,000 to 200,000. When the weight average molecular weight of the polymer contained in the liquid-absorbing particle is higher within the above range, the viscoelastic property tends to be improved due to the high molecular weight, which is preferable in terms of transferability and fixability. When the weight average molecular weight is lower within the above range, the viscosity after absorption of water tends to be low, which is preferable in terms of transferability and fixability.

When the weight average molecular weight of the polymer contained in the first liquid-absorbing particles and the weight average molecular weight of the polymer contained in the second liquid-absorbing particles are respectively in the above ranges, an excellent transferability may be obtained due to adequate hardness and adhesiveness of the ink absorbing particle, whereby unevenness of image after fixing may be suppressed. Similarly, when the weight average molecular weight of the polymer contained in the liquid-absorbing particle that is itself a mother particle is in the above range, an excellent transferability may be obtained due to adequate hardness and adhesiveness of the ink absorbing particle, whereby unevenness of image after fixing may be suppressed.

The weight average molecular weight of the polymer (A) contained in the first liquid-absorbing particles is preferably from 40,000 to 100,000. The weight average molecular weight of the polymer (B) contained in the second liquid-absorbing particles is preferably from 15,000 to 40,000. When a single liquid-absorbing particle is itself a mother particle, the weight average molecular weight of the polymer contained in the liquid-absorbing particle is more preferably from 15,000 to 100,000.

Here, the weight-average molecular weight of the polymer is measured under the following conditions.

The GPC apparatus: HLC-812OGPC, SC-8020 (manufactured by Tosoh Corporation)

Columns: two pieces of TSK gel, SuperHM-H (manufactured by Tosoh Corporation, 6.0 mm ID×15 cm)

Eluent: THF (tetrahydrofuran)

(Conditions at measurement)

Sample concentration: 0.5%

Flow rate: 0.6 ml/min

Sample injection amount: 10 μl

Measuring temperature: 40° C.

Detector: IR detector

Calibration curve: prepared using ten samples of polystyrene standard samples TSK standards (trade names: A-500, F-1, F-10, F-80, F-380, A-2500, F-4, F-40, F-128, and F-700, manufactured by Tosoh Corporation).

The weight average molecular weights of the polymers (A) and (B) contained in the first and second liquid-absorbing particles may be adjusted by conventionally-known methods, and may be adjusted by, for example, changing the reaction time and reaction temperature of polymer synthesis.

The mixing ratio (weight of the first liquid-absorbing particles: weight of the second liquid-absorbing particles) of the weight of the first liquid-absorbing particles containing the polymer (A) to the weight of the second liquid-absorbing particles containing the polymer (B) is preferably from 10:90 to 90:10, (or about 10:90 to about 90:10) and more preferably from 20:80 to 70:30.

Molar Concentration of Carboxylate in Polymer Contained in Liquid-Absorbing Particles:

It is preferable that the first liquid-absorbing particles are particles containing polymer (a) including a carboxylate at a molar concentration of from $2.1\times10^{-3}$ mol/g to $4.5\times10^{-3}$ mol/g and that the second liquid-absorbing particles are particles containing polymer (b) including a carboxylate at a molar concentration of from $1.0\times10^{-3}$ mol/g to $2.1\times10^{-3}$ mol/g but at a lower molar concentration than that of the polymer (a).

When the molar concentration of carboxylate in any of the first and second polymers contained in the liquid-absorbing particles is higher within the above ranges, the time the liquid-absorbing particles take to absorb ink may be shortened. When the molar concentration of carboxylate is lower within the above ranges, transferability and fixability may be improved due to adequate hardness and appropriate viscoelasticity of the liquid-absorbing particles.

When a single liquid-absorbing particle is itself a mother particle, it is preferable that the liquid-absorbing particle is a particle containing a polymer including a carboxylate at a molar concentration of from $1.0\times10^{-3}$ mol/g to $4.5\times10^{-3}$ mol/g. When the molar concentration of carboxylate in the polymer contained in the liquid-absorbing particle is higher within the above range, the time the liquid-absorbing particle takes to absorb ink may be shortened. When the molar concentration of carboxylate is lower within the above range, transferability and fixability may be improved due to adequate hardness and appropriate viscoelasticity of the liquid-absorbing particle.

When the respective molar concentrations of carboxylate in the polymer contained in the first and second liquid-absorbing particles are in the above ranges, an excellent transferring property may be obtained since the ink absorbing particle is not excessively softened, whereby unevenness of image after fixing may be suppressed. Further, elongation of ink absorption time may be prevented. Similarly, when the molar concentration of carboxylate in the polymer contained in the liquid-absorbing particle that is itself a mother particle is in the above range, an excellent transferring property may be obtained since the ink absorbing particle is not excessively softened, whereby unevenness of image after fixing may be suppressed. Further, elongation of ink absorption time may be prevented.

The molar concentration of carboxylate in the polymer contained in the first liquid-absorbing particles is more preferably from $2.7\times10^{-3}$ mol/g to $3.6\times10^{-3}$ mol/g. The molar concentration of carboxylate in the polymer contained in the second liquid-absorbing particles is more preferably from $1.4\times10^{-3}$ mol/g to $2.1\times10^{-3}$ mol/g. When a single liquid-absorbing particle is itself a mother particle, the molar concentration of carboxylate in the polymer contained in the liquid-absorbing particle is more preferably from $1.4\times10^{-3}$ mol/g to $3.6\times10^{-3}$ mol/g.

Here, the molar concentration of carboxylate in each of the first and second liquid-absorbing particles, or in the liquid absorbing particle that is itself a mother particle, is measured as follows:

(1) 1 g of the polymer is dissolved in a mixed solution of isopropyl alcohol (IPA) and water;

(2) the amount of HCl consumed in an acid number measuring method (using a potentiometer and a pH meter) based on an electric potential difference measuring method according to JIS-K2501 (2003) (the disclosure of which is incorporated by reference herein) is measured using aqueous HCl as a titration solution.

(3) the molar amount of ($COO^-$) is calculated from the amount of consumed HCl.

The molar concentration of carboxylate in the polymer contained in the first liquid-absorbing particles and the molar concentration of carboxylate in the polymer contained in the second liquid-absorbing particles are adjusted by, for example, adjusting the amount of salt used for neutralization. The molar concentration of carboxylate in the polymer contained in the liquid-absorbing particle that is itself a mother particle may be adjusted in a similar manner.

The mixing ratio (amount of the first liquid-absorbing particles: amount of the second liquid-absorbing particles) by weight of the first liquid-absorbing particles containing the polymer (a) to the second liquid-absorbing particles containing the polymer (b) is preferably from 10:90 to 90:10 (or about 10:90 to about 90:10), and more preferably from 20:80 to 70:30.

In the first liquid-absorbing particles, it is preferable that the polymer (A), having a weight average molecular weight of from 30,000 to 200,000, has a carboxylate molar concentration of from $2.1\times10^{-3}$ mol/g to $4.5\times10^{-3}$ mol/g (or from about $2.1\times10^{-3}$ mol/g to about $4.5\times10^{-3}$ mol/g). In the second liquid-absorbing particles, it is preferable that the polymer (B), having a weight average molecular weight of from 10,000 to 50,000 but having a lower weight average molecular weight than the polymer (A), has a carboxylate molar concentration of from $1.0\times10^{-3}$ mol/g to $2.1\times10^{-3}$ mol/g (or from about $1.0\times10^{-3}$ mol/g to about $2.1\times10^{-3}$ mol/g) but at a lower molar concentration than that of the polymer (A). When a single liquid-absorbing particle is itself a mother particle, it is preferable that the polymer having a weight average molecular weight of from 10,000 to 200,000, has a carboxylate molar concentration of from $1.0\times10^{-3}$ mol/g to $4.5\times10^{-3}$ mol/g.

When a liquid-absorbing particle is itself a mother particle, the liquid-absorbing particle may further contain a component other than the above polymers. When a composite particle is used as a mother particle, the first and second liquid-absorbing particles may further contain a component other than the above polymers. Other components that may be added to the liquid-absorbing particle or to the first and second liquid-absorbing particles are described below. The content of the polymer (A) having a weight average molecular weight within the above-described range in the first liquid-absorbing particles is preferably from 80 weight % or more, and more preferably 90 weight % or more. The content of the polymer (B) having a weight average molecular weight within the above-described range in the second liquid-absorbing particles is preferably from 80 weight % or more, and more preferably 90 weight % or more.

Next, materials forming the liquid-absorbing particle that is a mother particle itself or forming the first and second liquid-absorbing particles in the composite particle will be described.

The liquid-absorbing particle that is a mother particle itself and the first and second liquid-absorbing particles in the composite particle are hereinafter sometimes collectively referred to as "liquid-absorbing particles." The liquid-absorbing particles may contain a polymer formed from a hydrophilic monomer and/or a hydrophobic monomer. The hydrophilic monomer may contain both a hydrophilic group not having a salt structure and a hydrophilic group having a salt structure.

Examples of the hydrophilic group not having a salt structure include a carboxyl group, a hydroxyl group, an epoxy group, a glycidyl group, a sulfonic acid group, an isocyanate group, and an acetic anhydride group. Among them, a carboxyl group is preferable.

Examples of the salt structure in the hydrophilic group having a salt structure include a salt structure formed by the hydrophilic group not having a salt structure and an alkali metal, a salt structure formed by the hydrophilic group not having a salt structure and a polyvalent metal, and a salt structure formed by the hydrophilic group not having a salt structure and an organic amine. The alkali metal, polyvalent metal, and organic amine are so-called counter ions for forming salt structures.

Examples of the alkali metal include $Na^+$, $Li^+$, and $K^{30}$. Examples of the polyvalent metal include an aluminum ion, barium ion, calcium ion, copper ion, iron ion, magnesium ion, manganese ion, nickel ion, tin ion, titanium ion, and zinc ion. Examples of the organic amine include a primary amine, a secondary amine, a tertiary amine, and a quaternary amine, and salts thereof. Among the polyvalent metal ions, an aluminum ion, a barium ion, a calcium ion, a magnesium ion, and a zinc ion are preferable. The counter ion for forming the salt structure is more preferably an alkali metal (e.g. $Na^+$, $Li^+$, or $K^+$).

The molar ratio of the hydrophilic group not having a salt structure is preferably from 5 mol % to 50 mol %, more preferably from 10 mol % to 40 mol %, and still more preferably from 30 mol % to 40 mol %, with respect to the total amount of the monomer components of the ink absorbing particle.

The molar ratio of the hydrophilic group having a salt structure is preferably from 5 mol % to 40 mol %, more preferably from 10 mol % to 30 mol %, and still more preferably from 20 mol % to 30 mol %, with respect to the total amount of the monomer components of the ink absorbing particle.

The molar ratio of the hydrophilic group having a salt structure with respect to the total amount of hydrophilic groups is preferably from 0.3 mol % to 0.7 mol %, and more preferably from 0.3 mol % to 0.5 mol %. Here, the total amount of hydrophilic groups means the total of "the amount of the hydrophilic group having a salt structure+the amount of the hydrophilic group not having a salt structure", and the "molar ratio of the hydrophilic group having a salt structure relative to the total amount of hydrophilic groups" means a ratio of "the mole number of the hydrophilic group having a salt structure/(the mole number of the hydrophilic group not having a salt structure+the mole number of the hydrophilic group having a salt structure)".

Example of methods for obtaining a polymer containing both a hydrophilic group not having a salt structure and a hydrophilic group having a salt structure include the following methods:

1) a method including dissolving a polymer in a solvent, partially neutralizing the dissolved polymer with base, and then causing aggregation of the polymer;

2) a method including dissolving a polymer in a solvent, partially neutralizing the polymer with base, and then concentrating the resultant solution to obtain a desired polymer; and 3) a method including scattering a basic substance solution onto a polymer and drying the polymer.

The molar ratio of the hydrophilic group not having a salt structure is determined as follows. A polymer to be tested is dissolved in an IPA (isopropyl alcohol)/water mixture. The molar ratio of [COOH] and/or [$SO_3H$] is determined by conductimetric titration of the resulting solution using potassium hydroxide. When the polymer contains a hydroxyl group, the hydroxyl value is measured by a conductimetric titration method in accordance with JIS K0070 (the disclosure of which is incorporated by reference herein). From the obtained values, the total molar ratio of hydrophilic groups not having a salt structure is determined.

The molar ratio of the hydrophilic group having a salt structure is determined as follows. A polymer to be tested is dissolved in an IPA/water mixture. The molar ratio of [$COO^-$] and/or [$SO^{3-}$] is determined by conductimetric titration of the resulting solution using hydrochloric acid.

Hereinafter, the polymer will be described. Examples of the polymer included in the liquid-absorbing particle include a copolymer formed from both a hydrophilic monomer and a hydrophobic monomer. The starting materials for the synthesis of the polymer are not limited to monomers, and the polymer may be a graft copolymer or a block copolymer prepared by copolymerizing a starting unit such as a polymer or oligomer structure with one or more other units.

Examples of the hydrophilic monomer include a monomer which contains at least α, β unsaturated ethylenic structure and has a hydrophilic group not having a salt structure and a monomer which contains at least α, β unsaturated ethylenic structure and has a hydrophilic group having a salt structure. For example, when the ink absorbing particle is positively chargeable, the hydrophilic monomer may be a monomer having a (substituted) amino group or a (substituted) pyridine group, or a monomer having a salt forming structure such as a structure forming an amine salt or a quaternary ammonium salt. When the ink absorbing particle is negatively chargeable, the hydrophilic monomer may be a monomer having an organic acid group (such as a carboxyl group or a sulfonic acid group) or a monomer having a salt structure of an organic acid group (such as a carboxyl group or a sulfonic acid group).

Specific examples of the hydrophilic monomer include (meth)acrylic acid, crotonic acid, itaconic acid, itaconic acid monoester, maleic anhydride, maleic acid monoester, fumaric acid, fumaric acid monoester, sorbic acid, vinyl sulfonic acid, sulfonated vinylnaphthalene, and hydroxyalkyl. Among them, (meth)acrylic acid is preferable.

Examples of the hydrophilic unit, such as a polymer or oligomer structure, include cellulose derivatives such as cellulose, ethylcellulose, carboxymethylcellulose; starch derivatives, monosaccharide or polysaccharide derivatives, polymerizable carboxylic acids such as vinyl sulfonic acid, styrene sulfonic acid, acrylic acid, methacrylic acid, (anhydrous) maleic acid, and (partially) neutralized salts thereof, vinyl alcohols; vinyl pyrrolidone, vinyl pyridine, amino (meth)acrylate or dimethyl amino(meth)acrylate, or onium salts thereof, amides such as acrylamide and isopropyl acrylamide; vinyl compounds containing polyethylene oxide chain; vinyl compounds containing hydroxyl group; polyesters composed of multifunctional carboxylic acid and polyhydric alcohol; branched polyesters containing tri- or higher functional acids such as trimellitic acid as a constituent and containing many terminal carboxylic acids or hydroxyl groups, polyester having polyethylene glycol structure, and the like.

The terms (meth) and (anhydrous) as used herein refers to a compound having the term in parentheses and/or not to a compound not having the term in parentheses (the same applies in the following description).

Examples of the hydrophobic monomer include a monomer which contains at least an α,β-ethylenic unsaturated structure and has a hydrophobic group. The hydrophobic monomer may be a hydrophobic monomer that contains neither a hydrophilic group not having a salt structure nor a hydrophilic group having a salt structure.

Specific examples of the monomer having a hydrophobic group which is used as a hydrophobic monomer include olefins (such as ethylene or butadiene), styrene, α-methylstyrene, α-ethylstyrene, methyl methacrylate, ethyl methacrylate, butyl methacrylate, acrylonitrile, vinyl acetate, methyl acrylate, ethyl acrylate, butyl acrylate, and lauryl(meth)acrylate. Examples of the hydrophobic monomer include a styrene derivative such as styrene, α-methylstyrene or vinyltoluene, vinylcyclohexane, vinyl naphthalene, a vinyl naphthalene derivative, an alkyl acrylate, phenyl acrylate, an alkyl(meth)acrylate, phenyl(meth)acrylate, a cycloalkyl (meth)acrylate, an alkyl crotonate, a dialkyl itaconate, a dialkyl maleate, and derivatives thereof. Among them, butadiene, isoprene, propylene, an alkyl(meth)acrylate, an alkyl crotonate, an alkyl itaconate, an alkyl maleate, and styrene are preferable, and butadiene, an alkyl(meth)acrylate, and styrene are more preferable.

The molar ratio of the hydrophobic group is preferably from 20 mol % to 80 mol %, and is more preferably from 40 mol % to 70 mol %, relative to the total amount of the monomer components contained in the ink absorbing particle.

The molar ratio of the hydrophobic group is determined by the following formula:

The molar ratio of the hydrophobic group=100−[the molar ratio of the hydrophilic group not having a salt structure]−[the molar ratio of the hydrophilic group having a salt structure]

Specific examples of the copolymer of a hydrophilic monomer and a hydrophobic monomer include an olefin copolymer such as a styrene-alkyl(meth)acrylate-(meth) acrylic acid copolymer, a styrene-(meth)acrylic acid-(anhydrous)maleic acid copolymer, or an ethylene-propylene copolymer; a modified product of such an olefin copolymer; a polymer obtained by incorporating a carboxylic acid unit into such an olefin copolymer by copolymerization; a branched polyester whose acid value has been increased by using trimellitic acid or the like; and a polyamide.

The polymer may contain a substituted or non-substituted amino group or a substituted or non-substituted pyridine group. Such a group may have a bactericidal effect or may interact with a colorant (such as a pigment or a dye) having an anionic group.

The molar ratio of the hydrophilic monomer to the hydrophobic monomer (hydrophilic monomer: hydrophobic monomer) in the polymer is, for example, from 5:95 to 70:30.

The polymer may be ionically-crosslinked by ions supplied from ink. In this case, the polymer may contain a unit having carboxylic acid, and examples of such a polymer include copolymers containing a carboxylic acid such as (meth)acrylic acid or maleic acid and (branched) polyesters having a carboxylic acid. Ionic crosslinking and/or acid-base interaction occurs between the carboxylic acid in the polymer and a cation supplied from a liquid such as a water-based ink, such as an alkaline metal cation, an alkaline earth metal cation, an organic amine, or an onium cation.

The polymer may be a liquid-absorbing polymer. In this case, an absorbed ink liquid component (for example, water or aqueous solvent) may act as a plasticizer of the polymer (polymer), whereby the polymer may be softened and may contribute to improvement of fixability.

The polymer may be a weakly liquid-absorbing polymer. The weakly liquid-absorbing polymer is a polymer that can absorb liquid in an amount of, for example when the liquid is water, from several percent (approximately 5 percent) to hundreds percent (approximately 500 percent), and preferably from 5% to 100%, relative to the weight of the polymer.

The polymer may have a straight chain structure, but is preferably a polymer having a branched structure. The polymer is preferably non-crosslinked or slightly crosslinked. The polymer may be a random or block copolymer having a straight chain structure, but is preferably a polymer having a branched structure (examples thereof including a random, block or graft copolymer having a branched structure). For example, in the case of polyesters synthesized by polycondensation, the number of the end groups may be increased by adopting a branched structure. Such a branched structure may be obtained by general techniques, such as by adding a crosslinking agent (e.g., divinylbenzen or di(meth)acrylate) in an amount of, for example, less than 1% at the time of synthesis or by adding a large amount of initiator together with a crosslinking agent.

A charge controlling agent for electrophotographic toner, such as a salt forming compound (such as a low-molecular-weight quaternary ammonium salt, an organic borate, or a salicylic acid derivative), may be added to the polymer. For controlling the conductivity, it is effective to add a conductive or semiconductive inorganic material such as tin oxide or titanium oxide; "conductive" indicates that the volume resistivity is less than $10^7$ Ω·cm and the same applies hereinafter unless otherwise specified, and "semiconductive" indicates that the volume resistivity is in the range of from $10^7$ Ω·cm to $10^{13}$ Ω·cm and the same applies hereinafter unless otherwise specified.

The ink absorbing particle according to the first exemplary embodiment may further include, in addition to the liquid-absorbing particle(s), at least one inorganic particle to form a composite particle. In other words, when a single liquid-absorbing particle is itself a mother particle, the ink absorbing particle may contain at least one inorganic particle; when an aggregate of the first and second liquid-absorbing particles is a mother particle, the ink absorbing particle may be a composite particle composed of the first and second liquid-absorbing particles and the at least one inorganic particle. Further, as described above, inorganic particles may be adhered to the liquid-absorbing particle(s) wherein the inorganic particles are smaller than the liquid-absorbing particle(s).

Here, the inorganic particle included in the composite particle together with the liquid-absorbing particle will be described. The inorganic particle may be either a porous particle or a non-porous particle. Examples of the inorganic particle include colorless, pale-colored, or white particles (such as a particle of colloidal silica, alumina, calcium carbonate, zinc oxide, titanium oxide, or tin oxide). These inorganic particle may be surface-treated (such as partial hydrophobizing treatment or introduction of a specific functional group). In the case of silica, for example, a hydroxyl group of silica may be treated with a silylating agent such as trimethyl chlorosilane or t-butyl dimethyl chlorosilane to introduce an alkyl group. The silylating agent causes dehydrochlorination, and thus enhances the reaction. When an amine is added to this reaction system, hydrochloric acid is converted into hydrochloride, and therefore, reaction is promoted. The reaction may be controlled by regulating the treating amount or treating conditions of a silane coupling agent having an alkyl group or phenyl group as a hydrophobic group, or a coupling agent such as a titanate coupling agent or a zirconate coupling agent. The surface treatment may also be carried out by using aliphatic alcohols, higher fatty acids, or derivatives thereof. Further, as for the surface treatment, a coupling agent having a cationic functional group such as a silane coupling agent having (substituted) amino groups, quaternary ammonium salt structure, or the like, a coupling agent having fluorine-containing functional group such as fluorosilane, and other coupling agents having anionic functional group such as carboxylic acid may be used. These inorganic particles may be included inside liquid-absorbing particles, that is to say, they may be internally added thereto.

The equivalent spherical diameter of the inorganic particles included in the composite particles is, for example, from 10 nm to 30 μm, preferably from 50 nm to 10 μm, and more preferably from 0.1 μm to 5 μm. The equivalent spherical diameter of the inorganic particles adhered to the mother particles is, for example, from 10 nm to 1 μm, preferably from 10 nm to 0.1 μm, and more preferably from 10 nm to 50 nm.

The ink absorbing particle of the first exemplary embodiment may contain a component that aggregates or thickens ink components.

The component having such a function may be contained as a functional group of the polymer or as an additional compound. Examples of such a functional group include carboxylic acid, polyvalent metal cation, and polyamine.

Specific examples of such a compound include aggregating agents such as an inorganic electrolyte, an organic acid, an inorganic acid, or an organic amine.

Among these aggregating agents, a polyvalent metal salt, such as $Ca(NO_3)$, $Mg(NO_3)$, $Al(OH)_3$, or a polyaluminum chloride, are preferable.

The aggregating agent may be used singly, or a mixture of two or more thereof may be used. The content of the aggregating agent may be from 0.01% by weight to 30% by weight, preferably from 0.1% by weight to 15% by weight, and more preferably from 1% by weight to 15% by weight.

Second Exemplary Embodiment

Material Set for Material

A material set for recording according to the second exemplary embodiment includes an ink and the ink absorbing particles according to the first exemplary embodiment. Hereinafter, an ink included in the material set for recording according to the second exemplary embodiment will be described.

Ink

The ink may be either a water-based ink or an oil-based ink, but in consideration of compatibility with the environment, the ink is preferably a water-based ink. The water-based ink (hereinafter, may be simply referred to as ink) contains an ink solvent (for example, water or a water-soluble solvent) as well as a colorant. As required, other additives may also be contained.

At first, the colorant will be explained. As the colorant, either a dye or a pigment may be used, but a pigment is preferable. As the pigment, either an organic pigment or an inorganic pigment may be used. When the pigment is a black pigment, examples thereof include a carbon black pigment such as furnace black, lamp black, acetylene black, or channel black. In addition to black and three primary colors of cyan, magenta and yellow, at least one of the following may be used: specific color pigments of red, green, blue, brown, white, and the like; metal glossy pigments of gold, silver, and the like; colorless or pale color extender pigments; plastic pigments; and the like. A pigment newly synthesized for the first exemplary embodiment may be used as a colorant.

Any of the following may be used as a pigment: a particle prepared by fixing a dye or a pigment onto the surface of silica, alumina, polymer beads, or the like as a core; an insoluble lake product of a dye; a colored emulsion; a colored latex; and the like.

Specific examples of the black pigment include RAVEN 7000 (trade name, manufactured by Columbian Chemicals Company); REGAL 400R (trade name, manufactured by Cabot Corporation); and COLOR BLACK FW1 (trade name, manufactured by Degussa). However, the pigments are not restricted thereto.

Specific examples of the cyan pigment include, but are not limited to, C.I. Pigment Blue-1, -2, -3, -15, -15:1, -15:2, -15:3, -15:4, -16, -22, and -60.

Specific examples of the magenta pigment include, but are not limited to, C.I. Pigment Red-5, -7, -12, -48, -48:1, -57, -112, -122, -123, -146, -168, -177, -184, -202, and C.I. Pigment Violet-19.

Specific examples of the yellow pigment include, but are not limited to, C.I. Pigment Yellow-1, -2, -3, -12, -13, -14, -16, -17, -73, -74, -75, -83, -93, -95, -97, -98, -114, -128, -129, -138, -151, -154, and -180.

When a pigment is used as a colorant, a pigment dispersing agent may be used together. Examples of a usable pigment dispersing agent include a polymer dispersing agent, an anionic surfactant, a cationic surfactant, an amphoteric surfactant, and a nonionic surfactant.

As a polymer dispersing agent, a polymer having a hydrophilic structure part and a hydrophobic structure part may used. As the polymer having a hydrophilic structure part and a hydrophobic structure part, a condensation polymer or an addition polymer may be used. The condensation polymer is, for example, a known polyester-based dispersing agent. The addition polymer is, for example, an addition polymer of a monomer having an α,β-ethylenically unsaturated group. A desired polymer dispersing agent may be obtained by copolymerizing a monomer having an α,β-ethylenically unsaturated group and a hydrophilic group and a monomer having an α,β-ethylenically unsaturated group and a hydrophobic group in combination. A homopolymer of a monomer having an α,β-ethylenically unsaturated group and a hydrophilic group may be used.

Examples of the monomer having an α,β-ethylenically unsaturated group and a hydrophilic group include a monomer having a carboxyl group, a sulfonic acid group, a hydroxyl group, a phosphoric acid group, or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxyethyl phosphate, bismethacryloxyethyl phosphate, methacryloxyethyl phenyl acid phosphate, ethyleneglycol dimethacrylate, or diethyleneglycol dimethacrylate.

Examples of the monomer having an α,β-ethylenically unsaturated group and a hydrophobic group include styrene, styrene derivatives such as α-methylstyrene or vinyl toluene, vinyl cyclohexane, vinyl naphthalene, vinyl naphthalene derivatives, alkyl acrylate, alkyl methacrylate, phenyl methacrylate, cycloalkyl methacrylate, alkyl crotonate, dialkyl itaconate, and dialkyl maleate.

Specific examples of the copolymer which is used as a polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer. Polymers obtained by copolymerizing a monomer having a polyoxyethylene group and/or a hydroxyl group with these polymers are also usable.

The weight-average molecular weight of the polymer dispersant may be from 2,000 to 50,000.

These pigment dispersing agents may be used singly, or two or more kinds thereof may be used in combination. Although the addition amount of the pigment dispersing agent varies according to the types of the pigments, but in general, it may be added at a ratio of from 0.1% by weight to 100% by weight in total with respect to the pigment.

A pigment self-dispersing in water may be used as a colorant. The pigment self-dispersing in water refers to the pigment having many water-solubilizing groups on the surface of the pigment, and may be stably dispersed in water in the absence of polymer dispersant. The pigment self-dispersiing in water may be obtained by applying surface modification treatments, such as an acid or a base treatment, a coupling agent treatment, a polymer graft treatment, a plasma treatment or a redox treatment, on a usual pigment.

As a pigment self-dispersing in water, in addition to the above-described surface-modified pigments, commercially available pigments such as CAB-O-JET-200, CAB-O-JET-300, IJX-157, IJX-253, IJX-266, IJX-273, IJX-444, IJX-55, CABOT 260 (trade names, manufactured by Cabot Corporation), and MICROJET BLACK CW-1 and CW-2 (trade names, manufactured by Orient Chemical Industries, Ltd.) are also usable.

The self-dispersing pigment is preferably a pigment having at least sulfonic acid, sulfonate, carboxylic acid, or carboxylate as a functional group on the surface thereof. A pigment having at least carboxylic acid or carboxylate as a functional group on the surface thereof is more preferable.

A pigment coated with a polymer may be used. Such a pigment is called a microencapsulated pigment, and commercially available microencapsulated pigments such as pigments manufactured by Dainippon Ink and Chemicals, Incorporated or TOYO INK MFG. Co., Ltd., as well as microencapsulated pigments prepared for use in the first exemplary embodiment, are usable.

A polymer-dispersed pigment in which a polymer substance is physically adsorbed on or chemically bonded to the above-mentioned pigment may be used.

Other examples of the colorant include dyes such as hydrophilic anionic dyes, direct dyes, cationic dyes, reactive dyes, high-molecular-weight dyes, and oil-soluble dyes; wax powder colored with a dye and emulsions thereof, polymer powder colored with a dye and emulsions thereof, fluorescent dyes; fluorescent pigments; infrared absorbers; ultraviolet absorbers; magnetic materials such as ferromagnetic materials such as ferrite and magnetite; semiconductors and photocatalysts such as titanium oxide or zinc oxide; and organic and inorganic electronic material particles.

The content (concentration) of the colorant may be from 5% by weight to 30% by weight with respect to the weight of the ink.

The volume average particle diameter of the colorant may be from 10 nm to 1,000 nm.

The volume average particle diameter of the colorant means the volume average particle diameter of the colorant itself, or, when an additive such as a dispersing agent is adhered onto the colorant, means the volume average particle diameter of the particles provided that the size of each particle refers to the size of the entire combined particle including the additive adhered thereto. The volume average particle diameter is measured with a MICROTRAC particle-size analyzer UPA 9340 (trade name, manufactured by Leeds & Northrup Corp.) as a measuring apparatus. The measurement is performed using 4 ml of ink placed in a measurement cell, according to a prescribed measuring method. As the parameters to be inputted at measurement, the viscosity of the ink is inputted as the viscosity, and the density of the colorant is inputted as the density of the dispersed particles.

Next, the water-soluble solvent will be described. As the water-soluble solvent, a polyhydric alcohol, a polyhydric alcohol derivative, a nitrogen-containing solvent, an alcohol, a sulfur-containing solvent, or the like may be used.

Specific examples of the water-soluble solvent include a polyhydric alcohol such as ethylene glycol, diethylene glycol, propylene glycol, butylene glycol, triethylene glycol, 1,5-pentane diol, 1,2-hexane diol, 1,2,6-hexane triol, glycerin or trimethylol propane; a sugar alcohol such as xylitol; and a saccharide such as xylose, glucose, or galactose.

Specific examples of the polyhydric alcohol derivative include ethyleneglycol monomethylether, ethyleneglycol monoethylether, ethyleneglycol monobutylether, diethyleneglycol monomethylether, diethyleneglycol monoethylether, diethyleneglycol monobutylether, propyleneglycol monobutylether, dipropyleneglycol monobutylether, and an ethylene oxide adduct of diglycerin.

Specific examples of the nitrogen-containing solvent include pyrrolidone, N-methyl-2-pyrrolidone, cyclohexyl pyrrolidone, and triethanol amine. Specific examples of the alcohol include ethanol, isopropyl alcohol, butyl alcohol, and benzyl alcohol. Specific examples of the sulfur-containing solvent include thiodiethanol, thiodiglycerol, sulfolane, and dimethyl sulfoxide.

It is also possible to use propylene carbonate, ethylene carbonate, or the like as a water-soluble solvent.

At least one kind of water-soluble solvent may be used. The content of the water-soluble solvent to be contained in the ink may be from 1% by weight to 70% by weight.

Next, the water will be described. As the water, in order to prevent contamination with impurities, ion exchanged water, ultra pure water, distilled water or ultrafiltrated water may be used.

Next, other additives will be described. A surfactant may be added to the ink.

Examples of the surfactant include various kinds of anionic surfactants, nonionic surfactants, cationic surfactants, amphoteric surfactants, and the like. Anionic surfactants and nonionic surfactants are preferable.

Hereinafter, specific examples of the surfactant will be described. Examples of the anionic surfactants include alkylbenzenesulfonate, alkylphenylsulfonate, alkylnaphthalenesulfonate, a higher fatty acid salt, a salt of sulfate ester of a higher fatty acid, a sulfonate of a higher fatty acid ester, a salt of a sulfate ester of a higher alcohol ether, a higher alcohol ether sulfonate salt, a salt of a higher-alkyl sulfosuccinate, polyoxyethylene alkylether carboxylate, polyoxyethylene alkylether sulfate, alkyl phosphate, and polyoxyethylene alkylether phosphate. Preferable examples of the anionic surfactants include dodecylbenzenesulfonate, isopropylnaphthalenesulfonate, monobutylphenylphenol monosulfonate, monobutylbiphenylsulfonate, monobutylbiphenylsulfonate, and dibutylphenylphenoldisulfonate.

Examples of the nonionic surfactants include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glyceryl fatty acid ester, polyoxyethyleneglyceryl fatty acid ester, polyglyceryl fatty acid ester, sucrose fatty acid ester, polyoxyethylene alkyl amine, polyoxyethylene fatty acid amide, alkylalkanolamide, polyethyleneglycol-polypropyleneglycol block copolymer, acetylene glycol, and polyoxyethylene adduct of acetylene glycol. Preferable examples of the nonionic surfactant include polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylolamide, polyethyleneglycol-polypropyleneglycol block copolymer, acetylene glycol, and polyoxyethylene adduct of acetylene glycol.

Further examples of the surfactant include silicone surfactants such as polysiloxane oxyethylene adduct; fluorinated surfactants such as perfluoroalkyl carboxylate, perfluoroalkyl sulfonate or oxyethylene perfluoroalkyl ether; and biosurfactants such as spiculisporic acid, rhamnolipid or lysolecithin.

These surfactants may be used singly, or two or more kinds thereof may be used as a mixture. The hydrophilic-lipophilic balance (HLB) of the surfactant may be in the range of from 3 to 20 in consideration of dissolution property.

The addition amount of the surfactant is, for example, from 0.001% by weight to 5% by weight, and preferably from 0.01% by weight to 3% by weight.

Furthermore, various additives may be added to the ink, such as a penetrating agent for adjusting the penetrability; polyethylene imine, a polyamine, polyvinyl pyrrolidone, polyethylene glycol, ethyl cellulose, or carboxymethyl cellulose for controlling ink properties such as for improving ink ejection property; or an alkali metal compound such as potassium hydroxide, sodium hydroxide or lithium hydroxide for adjusting the conductivity and the pH. As needed, at least one of a pH buffering agent, an antioxidant, a fungicide, a viscosity adjusting agent, a conductive agent, an ultraviolet absorbing agent, a chelating agent, or the like may be added.

Preferable characteristics of the ink will be described. The pH of the ink is preferably 7 or more, more preferably from 7 to 11, and even more preferably from 8 to 10.

Here, as the pH of ink, the value measured under the conditions of 23±0.5° C., and 55±5% R.H. using a pH/conductivity meter (trade name: MPC227, manufactured by Mettler Toledo) is used.

The surface tension of the ink may be from 20 mN/m to 40 mN/m, and preferably from 25 mN/m to 35 mN/m.

Here, as the surface tension, the value measured under the conditions of 23° C., and 55% RH using a WILLHERMY-type surface tension meter (manufactured by Kyowa Interface Science Co., Ltd.) is used.

The ink composition is not particularly limited to the above, and may include other functional materials such as a crystal material or an electronic material, as well as the colorant.

Third Exemplary Embodiment

Recording Apparatus

Next, a recording apparatus according to the third exemplary embodiment will be explained.

In a recording apparatus according to the third exemplary embodiment, the ink absorbing particles according to the first exemplary embodiment and the ink according to the second exemplary embodiments are used. The recording apparatus includes an intermediate transfer member; a supplying device that supplies the ink absorbing particles onto the intermediate transfer member; an ink ejecting unit that ejects the ink droplets onto the ink absorbing particles that have been supplied onto the intermediate transfer member; a transfer device that transfers the ink absorbing particles and the ink onto a recording medium; and a fixing device that fixes the ink absorbing particles that have been transferred onto the recording medium.

Specifically, for example, the supplying unit supplies the ink absorbing particles onto an intermediate transfer member to form a particle layer. The ink ejecting unit ejects ink to the layer of ink absorbing particles that have been supplied onto the intermediate transfer member (hereinafter, simply referred to as an "ink absorbing particle layer"), and the ink is absorbed by the ink absorbing particle layer. The transfer unit transfers the ink absorbing particle layer having absorbed the ink from the intermediate transfer member onto a recording medium. In this process, the entire ink absorbing particle layer may be transferred, or only a recording area (ink absorbing area) may be selectively transferred. The fixing device fixes the ink absorbing particle layer onto a recording medium by applying pressure (or heat and pressure) thereto. In this way, recording with the ink absorbing particles that has absorbed the ink is performed. In this process, transfer and fixing may be performed substantially simultaneously or separately.

In this process, the ink absorbing particles are provided, for example, in the form of a layer for absorbing ink, and the thickness of the ink absorbing particle layer is preferably from 1 μm to 100 μm, more preferably from 3 μm to 60 μm, and still more preferably from 5 μm to 30 μm. The porosity of the ink absorbing particle layer (i.e., the total sum of the porosity with respect to the space among the ink absorbing particles and the porosity with respect to the voids within the respective ink absorbing particles (trap structure)) is preferably from 10% to 80%, more preferably from 30% to 70%, and still more preferably from 40% to 60%.

On the surface of the intermediate transfer member, a release agent may be previously applied before supplying the ink absorbing particles. Examples of the release agent include a (modified) silicone oil, a fluorine-containing oil, a hydrocarbon oil, a mineral oil, a vegetable oil, a polyalkyleneglycol, an alkyleneglycol ether, an alkane diol, and a fused wax.

The recording medium may be either a permeable medium (for example, plain paper or coated paper) or an impermeable medium (for example, art paper or polymer film). The recording medium is not limited thereto, and examples thereof include a semiconductor substrate and other industrial products.

Hereinafter, the recording apparatus according to the third exemplary embodiment will be described with reference to drawings. Elements having the same effect and function are designated by the same reference character throughout the drawings, and overlapped description therefor is omitted in some cases.

Figure 3:
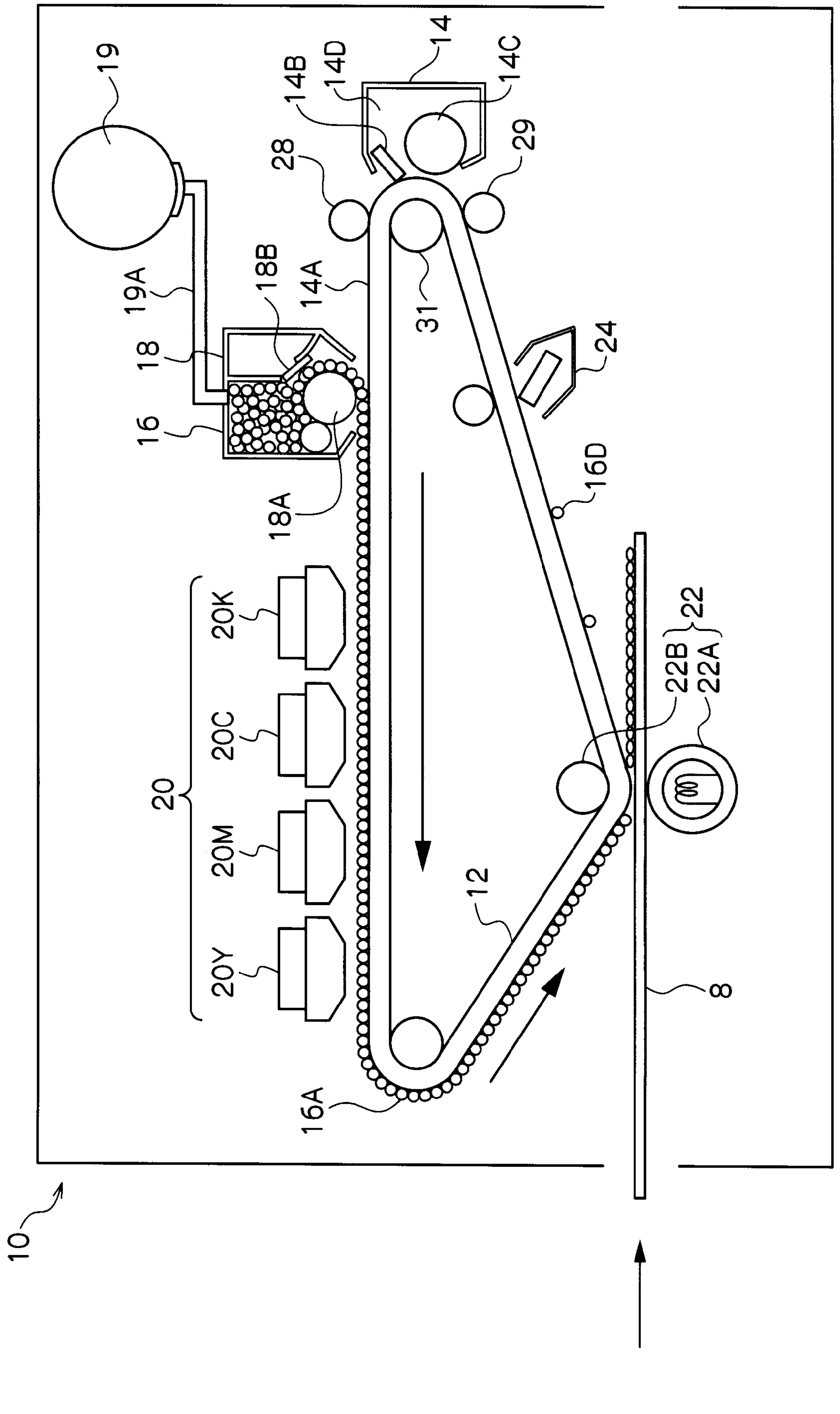
FIG. 3 is a schematic configuration diagram illustrating a recording apparatus according to an exemplary embodiment of the invention.
Figure 4:
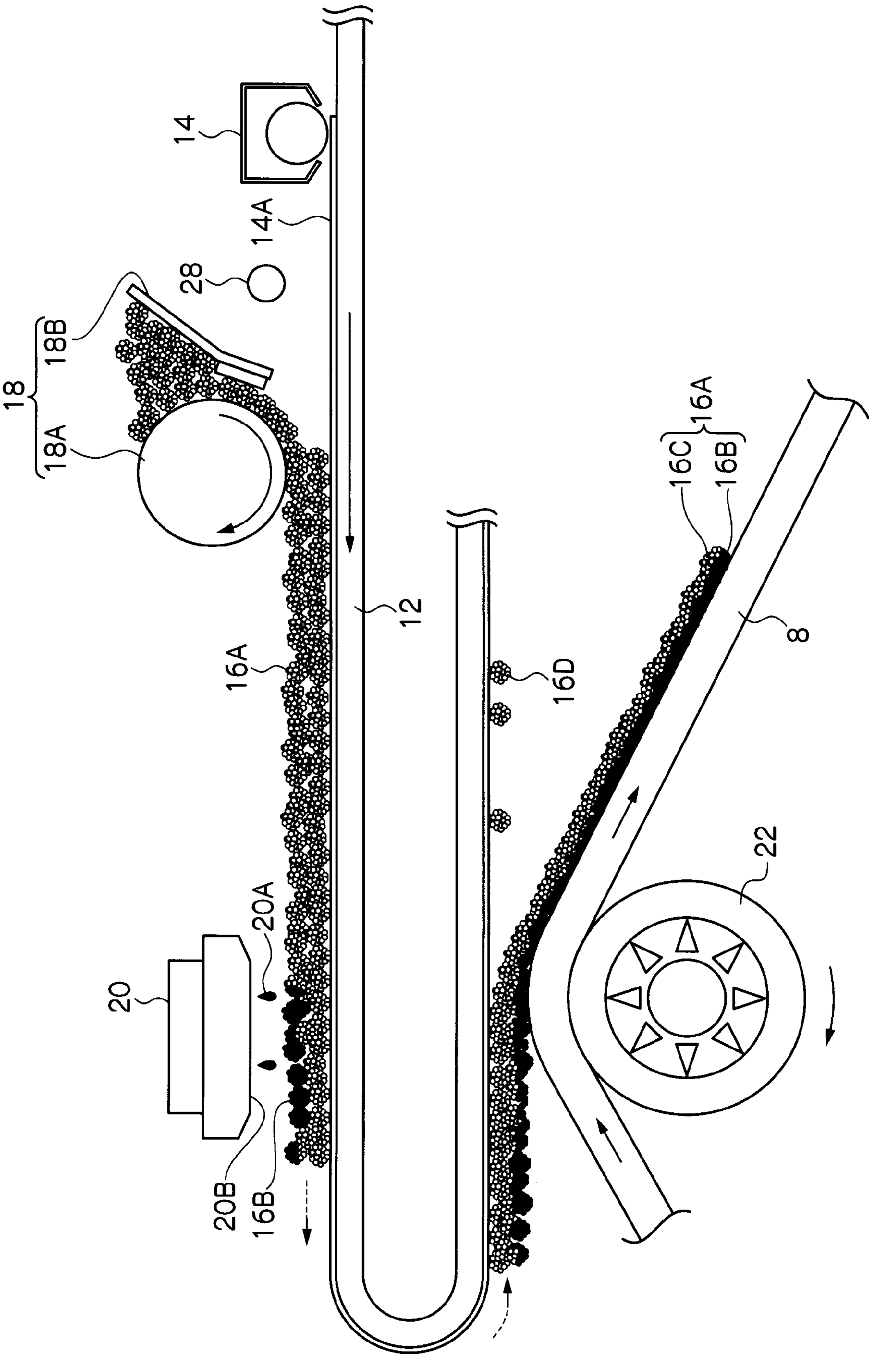
FIG. 4 is a schematic configuration diagram illustrating a main part of a recording apparatus according to an exemplary embodiment of the invention.
Figure 5A:
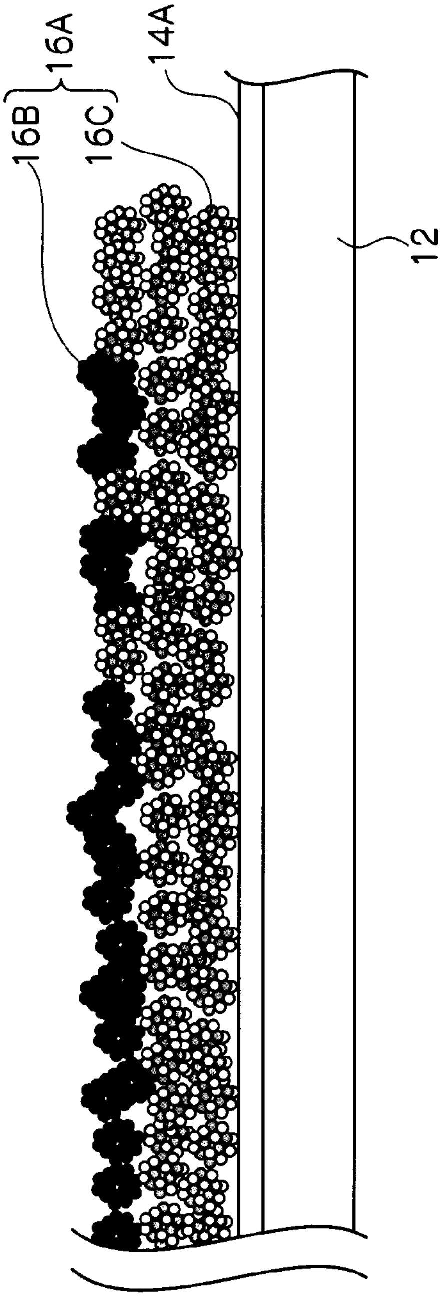
FIG. 5A and FIG. 5B are schematic configuration diagrams illustrating ink absorbing particle layers according to an exemplary embodiment of the invention.
Figure 5B:
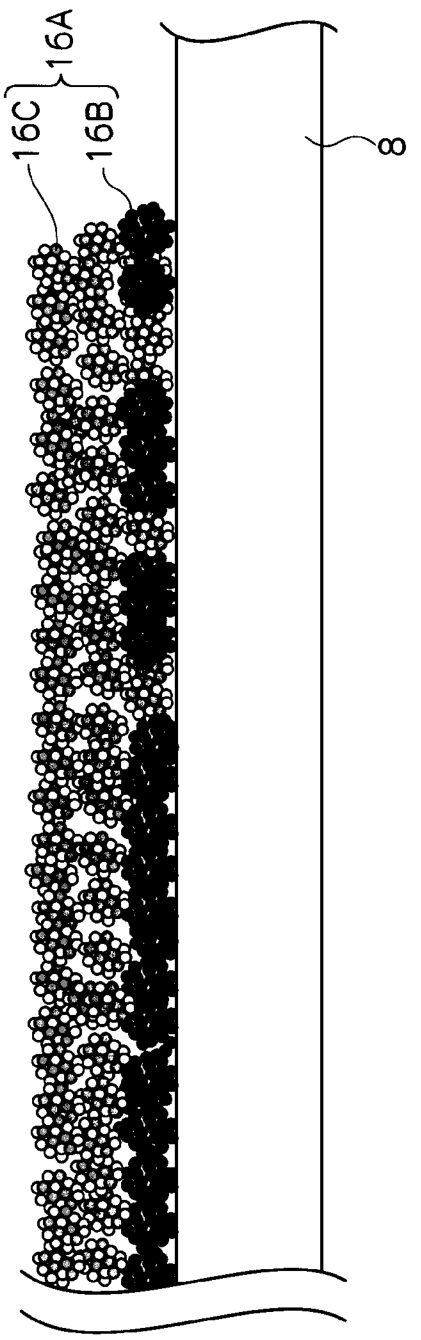

FIG. 3 is a configuration diagram of an example of a recording apparatus according to the third exemplary embodiment. FIG. 4 is a configuration diagram of a major portion of an example of the recording apparatus according to the third exemplary embodiment. FIG. 5A and FIG. 5B are schematic diagrams showing an ink absorbing particle layer in an example of the recording apparatus according to the third exemplary embodiment. In the following exemplary embodiment, description is given assuming that composite particles are used as the ink absorbing particles described below.

As shown in FIG. 3 and FIG. 4, a recording apparatus 10 of FIG. 3 includes an intermediate transfer member 12 in the form of an endless belt, a charging device 28 that charges a surface of the intermediate transfer member 12, a particle supplying device 18 that supplies ink absorbing particles 16 to the charged area of the intermediate transfer member 12 to form a particle layer, an inkjet recording head 20 that ejects ink droplets onto the particle layer to form an image, and a transfer fixing device 22 that transfers and fixes the layer of the ink absorbing particles onto a recording medium 8 by contacting the intermediate transfer member 12 with the recording medium 8 and applying pressure and heat thereto. An ink absorbing particle storing cartridge 19 is detachably connected to the particle supplying device 18 via a supplying pipe 19A.

A release agent supplying device 14 that supplies a release agent 14D to form a release layer 14A is disposed upstream of the charging device 28.

The surface of the intermediate transfer member 12 that has been charged by the charging device 28 is provided with a layer of the ink absorbing particles 16, using the particle supplying device 18. Ink droplets of the respective colors are ejected from the inkjet recording heads 20 for respective colors onto the particle layer, thereby forming a color image; the inkjet recording heads 20 are inkjet recording heads 20K, 20C, 20M, and 20Y in this case.

The particle layer having a surface on which the color image is formed is transferred, together with the color image, to the recording medium 8 by the transfer fixing device (transfer fixing roll) 22. Cleaner 24 is disposed downstream of the transfer fixing device 22 and removes residual ink absorbing particles 16D remaining on the surface of the intermediate transfer member 12 and other contaminants adhering to the intermediate transfer member (such as paper powder from the recording medium 8).

The recording medium 8 having the transferred color image is conveyed and discharged, and the surface of the intermediate transfer member 12 is charged again by the charging device 28. At this time, the ink absorbing particles transferred onto the recording medium 8 absorb and retain the ink droplets 20A, thereby enabling speedy discharge of the recording medium.

If necessary, a charge eraser 29 that removes the charge left on the surface of the intermediate transfer member 12 may be disposed between the cleaning device 24 and the release agent supplying device 14 (hereinafter, the phrase "between A and B" indicates "between A and B but excluding A and B", unless otherwise stated).

In the recording apparatus shown in FIG. 3, the intermediate transfer member 12 includes a surface layer of 400 μm-thick ethylene-propylene rubber (EPDM) formed on a base layer made of a 1 mm-thick polyimide film. This surface layer may have a surface resistivity of about $10^{13}$ Ω/sq. and a volume resistivity of about $10^{12}$ Ω·cm (semiconductivity).

When the intermediate transfer member 12 is rotated, first, the release agent layer 14A is formed on a surface of the intermediate transfer member 12 by the release agent supplying device 14. Specifically, the release agent 14D is supplied onto the surface of the intermediate transfer member 12 by a supply roll 14C of the release agent supplying device 14, and the thickness of the release agent layer 14A is regulated by a blade 14B.

The release agent supplying device 14 may be in contact with the intermediate transfer member 12 in a continuous manner for the purpose of performing continuous image formation and continuous printing, or, alternatively, the release agent supplying device 14 may be placed apart from the intermediate transfer member 12.

The release agent 14D may be supplied from an independent liquid supply system (not shown) to the release agent supplying device 14 so that the supply of the release agent 14D is not depleted.

Next, a positive charge is imparted to the surface of the intermediate transfer member 12 by the charging device 28 so that the surface of the intermediate transfer member 12 is positively charged. In this process, such an electric potential is formed that the ink absorbing particles 16 can be supplied and adsorbed onto the surface of the intermediate transfer member 12 by an electrostatic force caused by an electric field generated between a supplying roll 18A of the particle supplying device 18 and the surface of the intermediate transfer member 12.

In the recording apparatus 10 shown in FIG. 3, the device has such a structure that a voltage is generated between the charging device 28 and a driven roll 31 (which is connected to the ground) by the charging device 28, thereby charging the surface of the intermediate transfer member 12; the driven roll 31 is disposed such that the intermediate transfer member 12 is sandwiched between the charging device 28 and the driven roll 31.

The charging device 28 is a roll-shaped component that includes a rod-shaped stainless-steel material and an elastic layer in which an electrical conductivity-imparting material is dispersed (made of, for example, a urethane foam polymer) and which is formed on the outer circumferential surface of the rod-shaped material. The charging device may have a volume resistivity of from about $10^6$ Ω·cm to about $10^8$ Ω·cm. In addition, the surface of the elastic layer is covered with a water-repellant, oil-repellant coating layer (for example, made of a tetrafluoroethylene-perfluoroalkyl vinylether copolymer (PFA)) having a thickness of from 5 μm to 100 μm The charging device 28 is connected to a DC power source, and the driven roll 31 is electrically connected to the frame ground. The charging device 28 is driven while holding the intermediate transfer member 12 between the driven roll 31 and the charging device 28. At the pressing site, a predetermined degree of potential difference is generated between the charging device 28 and the grounded driven roll 31, by which a charge can be imparted to the surface of the intermediate transfer member 12. In this exemplary embodiment, the surface of the intermediate transfer member 12 is charged by applying a voltage of, for example, 1 kV onto the surface of the intermediate transfer member 12 by the charging device 28.

The charging device 28 may a corotron or the like.

The ink absorbing particles 16 are then fed from the particle supplying device 18 to the surface of the intermediate transfer member 12 to form an ink absorbing particle layer 16A. The particle supplying device 18 includes, in a vessel storing the ink absorbing particles 16, a supply roll 18A disposed to oppose the intermediate transfer member 12 and a charging blade 18B placed so as to apply pressure to the supply roll 18A. The charging blade 18B also have the function of controlling the thickness of the layer formed by the ink absorbing particles 16 supplied onto the surface of the supply roll 18A.

When the ink absorbing particles 16 are supplied to the supply roll 18A (conductive roll), the ink absorbing particle layer 16A is regulated by the charging blade 18B (conductive blade) and is provided with a negative charge, which is the polarity opposite to that of the charges on the surface of the intermediate transfer member 12. For example, an aluminum solid roll may be used as the supplying roll 18A. A metal plate (such as a SUS plate) with a urethane rubber for pressing may be used as the charging blade 18B. The charging blade 18B is in contact with the supply roll 18A by a doctor blade method.

The charged ink absorbing particles 16 form a particle layer (for example, a single layer) on the surface of the supply roll 18A and are delivered to a site facing the surface of the intermediate transfer member 12. When the charged ink absorbing particles 16 approach the site, the charged ink absorbing particles 16 are transferred onto the surface of the intermediate transfer member 12 by an electrostatic force formed by an electric field generated by the potential difference between the supply roll 18A and the surface of the intermediate transfer member 12.

In this process, the traveling speed of the intermediate transfer member 12 and the rotating speed of the supply roll 18A (the peripheral speed ratio) are relatively set such that a single layer of the particles is formed on the surface of the intermediate transfer member 12. The peripheral speed ratio may depend on the charge amount of the intermediate transfer member 12, the charge amount of the ink absorbing particles 16, the positional relationship between the supply roll 18A and the intermediate transfer member 12, and other parameters.

By relatively increasing the peripheral speed of the supply roll 18A from the peripheral speed ratio at which a single ink absorbing particle layer 16A is formed, the amount of the particles supplied onto the intermediate transfer member 12 may be increased. The peripheral speeds may be controlled such that the layer thickness becomes as described below.

If the density of the transferred image is low (the ejection amount of the ink is small; for example, from 0.1 $g/m^2$ to 1.5 $g/m^2$ s), the layer thickness may be the minimum thickness required, for example, from 1 μm to 5 μm.

If the image density is high (the ejection amount of the ink is large; for example, from 4 $g/m^2$ to 15 $g/m^2$), the layer thickness may be a sufficient thickness for retaining a liquid component of the ink, such as a solvent or a dispersion medium, and the layer thickness is, for example, from 10 μm to and 25 μm.

For example, when the ejection amount of the ink is small as in the case of a character image and the image is formed on a single ink absorbing particle layer provided on the intermediate transfer member, the image-forming material (pigment) in the ink is trapped on the surface of the ink absorbing particle layer provided on the intermediate transfer member, and is fixed on the surface of the ink absorbing particles or in voids among/within the ink absorbing particles, so that the distribution of the ink reduces in the depth direction.

For example, when it is desired to provide a particle layer 16C as a protective layer on an image layer 16B that will become a final image, the ink absorbing particle layer 16A may be formed to have a thickness corresponding to about three layers and an image may be formed with ink on the uppermost layer (see FIG. 5A). In this way, the particle layer 16C, which corresponds to two of the layers and which does not participate in retaining an image, will serve as a protective layer on the image layer 16B after the ink absorbing particles are transferred and fixed onto a recording medium (see FIG. 5B).

When an image with a large ink ejection amount is formed, such as an image including a secondary or tertiary color, a sufficient number of ink absorbing particles 16 are stacked such that the ink absorbing particles retain a liquid component of the ink (e.g., a solvent or a dispersion medium) and trap the colorant (e.g., a pigment) to prevent the colorant from reaching the bottom layer. In this case, the ink absorbing particles 16 that do not participate in retaining the image may serve as a protective layer on the image surface after the image layer is transferred and fixed, so that the image-forming material (pigment) is not exposed on the surface of the image layer.

The inkjet recording head 20 then applies ink droplets 20A onto the ink absorbing particle layer 16A. The inkjet recording head 20 applies the ink droplets 20A onto a predetermined location according to given image information.

Finally, the recording medium 8 and the intermediate transfer member 12 are nipped by the transfer fixing device 22, and pressure and heat are applied to the ink absorbing particle layer 16A so that the ink absorbing particle layer 16A is transferred onto the recording medium 8.

The transfer fixing device 22 includes a heating roll 22A containing a heat source and a pressing roll 22B facing the heating roll 22A with the intermediate transfer member 12 therebetween. A contact portion is formed between the heating roll 22A and the pressing roll 22B, at which the heating roll 22A and the pressing roll 22B nips the intermediate transfer member 12 and, optionally, the recording medium 8. An aluminum core whose outer surface is coated with a silicone rubber and further coated with a PFA tube may be used as at least one of the heating roll 22A or the pressing roll 22B.

At the contact portion between the heating roll 22A and the pressing roll 22B, the ink absorbing particle layer 16A is heated by a heater and pressed, whereby the ink absorbing particle layer 16A is transferred and fixed onto the recording medium 8.

In this process, polymer particles of the ink absorbing particles 16 in a non-image area are softened (or melted) by being heated at or above the glass transition temperature (Tg) thereof, and the ink absorbing particle layer 16A is released, by pressure, from the release layer 14A that has been formed on the surface of the intermediate transfer member 12 and transferred and fixed onto the recording medium 8. In this process, the transfer fixing ability may be improved by heating. In this exemplary embodiment, the temperature of the surface of the heating roll 22A is controlled to be 160° C. In this process, the liquid component of the ink (a solvent or a dispersion medium) once retained in the ink absorbing particle layer 16A is retained in the ink absorbing particle layer 16A even after the transfer, and is fixed. The intermediate transfer member 12 may be pre-heated before processed by the transfer fixing device 22.

The recording medium 8 may be a permeable medium (such as plain paper or inkjet coated paper) or an impermeable medium (such as art paper or a polymer film). The recording medium is not limited to the above, and may be another industrial product such as a semiconductor substrate.

The process in which an image is formed by the recording apparatus 10 shown in FIG. 3 will be described in more detail below. As shown in FIG. 4, the release layer 14A may be formed on the surface of the intermediate transfer member 12 by the release layer supplying device 14 in the recording apparatus 10 shown in FIG. 3. When the material of the intermediate transfer member 12 is aluminum or a PET-based material, formation of the release layer 14A is preferred. Alternatively, release property may be imparted to the surface of the intermediate transfer member 12 itself by using a material containing a fluoropolymer or a silicone rubber.

The surface of the intermediate transfer member 12 is then charged by the charging device 28, and the polarity of the charge on the surface of the intermediate transfer member 12 is opposite to that of the ink absorbing particles 16. Thus, the ink absorbing particles 16 supplied from the supply roll 18A of the particle supplying device 18 may be electrostatically adsorbed to form a layer of the ink absorbing particles 16 on the surface of the intermediate transfer member 12.

The layer of ink absorbing particles 16 are then formed on the surface of the intermediate transfer member 12 by the supply roll 18A of the particle supplying device 18. For example, the ink absorbing particle layer 16A is formed to have a thickness that is at or around the thickness of a stack formed by the ink absorbing particles 16 stacked to form three layers. Specifically, the thickness of the ink absorbing particle layer 16A is adjusted to a desired thickness by the gap between the supply roll 18A and the charging blade 18B, whereby the thickness of the ink absorbing particle layer 16A to be transferred to the recording medium 8 may be controlled. The thickness may be controlled by the ratio between the peripheral speeds of the supply roll 18A and the intermediate transfer member 12.

The ink droplets 20A are then ejected onto the formed ink absorbing particle layer 16A by the inkjet recording head 20 of each color via a nozzle 20B, which inkjet recording head is driven in a piezoelectric mode, a thermal mode or the like, to form the image layer 16B on the ink absorbing particle layer 16A. The ink droplets 20A are ejected from the inkjet recording head 20 onto the ink absorbing particle layer 16A, and the liquid component of the ink is rapidly absorbed into the space among the ink absorbing particles 16 and into the voids within the ink absorbing particles 16; further, the colorant (such as a pigment) is also trapped on the surface of each ink absorbing particle 16 (the particle constituting each ink absorbing particle 16) or in the voids within each ink absorbing particles 16.

In this process, while the ink liquid component (a solvent or a dispersion medium) in the ink droplets 20A infiltrates into the ink absorbing particle layer 16A, the colorant such as a pigment is trapped on the surface of the ink absorbing particle layer 16A or in the voids among/within the ink absorbing particle. In other words, the ink liquid component (a solvent or a dispersion medium) may be allowed to permeate through to the back side of the ink absorbing particle layer 16A, whereas the recording material such as a colorant is not allowed to permeate through to the back side of the ink absorbing particle layer 16A. Thus, when the image is transferred to the recording medium 8, a particle layer 16C to which the colorant such as a pigment has not permeated is disposed on an image layer 16B. As a result, the particle layer 16C serves as a protective layer that seals the surface of the image layer 16B, and an image having a surface on which the colorant such as a pigment is not exposed may be formed.

The ink absorbing particle layer 16A having the image layer 16B formed thereon is then transferred from the intermediate transfer member 12 onto the recording medium 8 and fixed to the recording medium 8, thereby forming a color image on the recording medium 8. The ink absorbing particle layer 16A on the intermediate transfer member 12 is heated and pressed by the transfer fixing device (a transfer fixing roll) 22 that is heated by a heating unit such as a heater, and is transferred onto the recording medium 8.

In this process, the surface irregularities of the image may be adjusted by controlling the heating and pressing conditions, so as to control the glossiness. The glossiness may be controlled alternatively by performing melting adhesion with the member and cooling before stripping from the member (MACS technology).

After the ink absorbing particle layer 16A has been separated, the residual particles 16D on the surface of the intermediate transfer member 12 are collected by the cleaning device 24 (see FIG. 3), and the surface of the intermediate transfer member 12 is charged again by the charging device 28, and the ink absorbing particles 16 are supplied thereon to form an ink absorbing particle layer 16A.

FIG. 5A and FIG. 5B show particle layers used in the recording apparatus 10 illustrated in FIG. 3. As shown in FIG. 5A, the release layer 14A is formed on the surface of the intermediate transfer member 12.

The ink absorbing particles 16 are then provided to form one or more layers on the surface of the intermediate transfer member 12, by the particle supply device 18. As described above, the ink absorbing particles 16 may be stacked to have a thickness corresponding to the thickness of about three layers. The thickness of the ink absorbing particle layer 16A to be transferred onto the recording medium 8 is adjusted by controlling the ink absorbing particle layer 16A to have a desired thickness. In this process, the surface of the ink absorbing particle layer 16A is smoothed so that image formation (formation of the image layer 16B) by ejecting ink droplets may be performed without difficulty.

As shown in FIG. 5A, a colorant such as a pigment contained in the ejected ink droplets 20A penetrates into the ink absorbing particle layer 16A to a depth that is from about ⅓ to about half of the total thickness of the ink absorbing particle layer 16A. The particle layer 16C into which a colorant such as a pigment has not penetrated remains under the ink absorbing particle layer 16A.

As shown in FIG. 5B, the ink absorbing particle layer 16A formed on the recording medium 8 by heat/press transfer at the transfer fixing device (transfer fixing roll) 22 includes the image layer 16B and an ink-free particle layer 16C provided on the image layer 16B. The layer 16C serves as a kind of protective layer that prevents the image layer 16B from being directly exposed on the surface. Therefore, the ink absorbing particles 16 may be transparent at least after fixation.

Since the particle layer 16C is heated and pressed by the transfer fixing device (transfer fixing roll) 22, the surface of the particle layer 16C may be smoothed, whereby the glossiness of the image surface may be controlled by heating or pressing.

Further, evaporation of the liquid ink component (a solvent or a dispersion medium) trapped in the ink absorbing particles 16 may be enhanced by heating.

The liquid ink component (a solvent or a dispersion medium) that has been absorbed and retained by ink absorbing particle layer 16A is retained in the ink absorbing particle layer 16A even after transfer and fixing, and is removed by natural drying.

The image forming process is completed through the above processes. After the ink absorbing particles 16 are transferred from the intermediate transfer member 12 to the recording medium 8, residual ink absorbing particles 16D remaining on the intermediate transfer member 12 or other matter such as paper dust detached from the recording medium 8 may be removed by the cleaning device 24.

Further, the charge eraser 29 may be disposed at the downstream side of the cleaning device 24. For example, when a conductive roll is used as the charge eraser 29, the surface of the intermediate transfer member 12 may be electrically neutralized by nipping the intermediate transfer member 12 between the conductive roll and a driven roll 31 (grounded), and applying a voltage of about ±3 kV and about 500 Hz to the surface of the intermediate transfer member 12.

The charging voltage, the thickness of the particle layer, the fixing temperature and other various conditions for the device may be optimized, respectively, depending on the composition of the ink absorbing particles 16 or ink, the amount of the ink to be ejected, and the like.

Constituent Elements

Constituent elements for each step of the exemplary embodiment will be described in detail below.

Intermediate Transfer Member

The intermediate transfer member 12 on which the ink absorbing particle layer is to be formed may be in the form of a belt as shown in the exemplary embodiment, or in the form of a cylinder (a drum). In order to supply and retain the ink absorbing particles on the surface of the intermediate transfer member 12 by electrostatic force, the outer surface of the intermediate transfer member 12 may have semiconductive or insulating property for retention of particles. When the electrical property of the surface of the intermediate transfer member is semiconductive, a material with a surface resistivity of from $10^{10}$ Ω/sq. to less than $10^{14}$ Ω/sq. and a volume resistivity of from $10^{9}$ Ω·cm to less than $10^{13}$ Ω·cm may be used, and when the electrical property of the surface of the intermediate transfer member is insulating, a material with a surface resistivity of $10^{14}$ Ω/sq. or more and volume resistivity of $10^{13}$ Ω·cm or more may be used.

When the intermediate transfer member is in the form of a belt, any material may be used as the base material of the intermediate transfer member, as long as the material is capable of belt rotation driving in an apparatus and has necessary mechanical strength; when heat is applied at transfer and/or fixing, the base material has necessary heat resistance. Specific examples of the base material include polyimide, polyamide-imide, aramid resin, polyethylene terephthalate, polyester, polyether sulfone, and stainless steel.

When the intermediate transfer member is in the form of a drum, the base material may be, for example, aluminum or stainless steel.

When electromagnetic induction heating is performed in the fixing process with the transfer fixing device (transfer fixing roll) 22, a heat generating layer may be formed at the intermediate transfer member 12 instead of on the transfer fixing device (transfer fixing roll) 22. A metal capable of causing electromagnetic induction may be used for the heat generating layer, and may be selected from, for example, nickel, iron, copper, aluminum, or chromium.

Particle Supply Process

Prior to supplying the ink absorbing particles 16, a surface of the intermediate transfer member 12 is provided with a release layer 14A formed of a release agent 14D by the release agent supplying device 14.

The method of supplying the release layer 14A may be a method including supplying the release agent 14D contained in the release agent supplying device 14 to a release agent supplying member and forming the release layer 14A by supplying the release agent 14D from the supplying member to the surface of the intermediate transfer member 12, or a method including forming the release layer 14A on the surface of the intermediate transfer member 12 by using a supplying member that is impregnated with the release agent 14D.

Examples of the release agent 14D include release materials such as a silicone oil, a fluorine-containing oil, a polyalkyleneglycol, or a surfactant.

Examples of the silicone oil include a straight silicone oil and a modified silicone oil. Examples of the straight silicone oil include dimethyl silicone oil and methyl hydrogen silicone oil. Examples of the modified silicone oil include a methyl styryl-modified silicone oil, an alkyl-modified silicone oil, a higher fatty acid ester-modified silicone oil, a fluorine-modified silicone oil and an amino-modified silicone oil.

Examples of the polyalkyleneglycol include polyethyleneglycol, polypropyleneglycol, an ethyleneoxide-propylene oxide copolymer, and polybutyleneglycol. Among them, polypropyleneglycol is preferable.

Examples of the surfactant include anionic surfactants, cationic surfactants, amphoteric surfactants, and nonionic surfactants. Among them, nonionic surfactants are preferable.

The viscosity of the release agent 14D is preferably from 5 mPa·s to 200 mPa·s, more preferably from 5 mPa·s to 100 mPa·s, and still more preferably from 5 mPa·s to 50 mPa·s.

The measurement of viscosity is performed as follows. The viscosity is measured by using a RHEOMAT 115 (manufactured by Contraves) as a measuring instrument. A sample is placed into a measuring vessel, the vessel is mounted in an apparatus by a prescribed method, and then the measurement is carried out at 40° C. at shear rate of 1400 $s^{-1}$.

The surface tension of the release agent 14D may be 40 mN/m or less (preferably 30 mN/m or less, and more preferably 25 mN/m or less).

The measurement of surface tension is performed as follows. The surface tension of a sample is measured under the conditions of 23±0.5° C. and 55±5% RH with a WILLHERMY-type surface tension meter (manufactured by Kyowa Interface Science Co., Ltd.).

The boiling point of the release agent 14D is, for example, in the range of 250° C. or more (preferably 300° C. or more, and more preferably 350° C. or more) under 760 mmHg.

The boiling point is measured in accordance with JIS K2254 (the disclosure of which is incorporated by reference herein), and an initial boiling point is used as the boiling point.

Using the charging device 28, the surface of the intermediate transfer member 12 is charged to have a charge whose polarity is opposite to the charging polarity of the ink absorbing particles 16. Then, the ink absorbing particle layer 16A is formed on the charged surface of the intermediate transfer member 12. As the method of forming the ink absorbing particle layer 16A, a general method of supplying an electrophotographic toner to a photoreceptor may be applied. Specifically, a charge is supplied, in advance, to the surface of the intermediate transfer member 12 by a general charging method for electrophotography (for example, charging by the charging device 28). The ink absorbing particles 16 are charged by friction (a single- or two-component frictional charging method) to have a charge of a polarity opposite to that of the charges on the surface of the intermediate transfer member 12.

An electric field occurs between the ink absorbing particles 16 held on the supply roll 18A and the surface of the intermediate transfer member 12, and the ink absorbing particles 16 are moved/supplied onto the intermediate transfer member 12 by an electrostatic force and held thereon. In this process, the thickness of the ink absorbing particle layer 16A may be controlled depending on the thickness of the image layer 16B to be formed in the ink absorbing particle layer 16A (in other words, depending on the amount of ink to be applied). In this process, the absolute value of the amount of the charge of the ink absorbing particles 16 may be in the range of from 5 μC/g to 50 μC/g.

Here, the thickness of the ink absorbing particle layer 16A is preferably from 1 μm to 100 μm, more preferably from 1 μm to 50 μm, and still more from 5 μm to 25 μm. The porosity of the ink absorbing particle layer (that is, sum of the porosity with respect to the space among the ink absorbing particles and the porosity with respect to the voids within the respective ink absorbing particles (trap structure)) is preferably from 10% to 80%, more preferably from 30% to 70%, and still more preferably 40% to 60%.

A particle supply process corresponding to single-component supply (development) system will be described below.

The ink absorbing particles 16 are supplied to a supply roll 18A, and a charging blade 18B charges the ink absorbing particles 16 while regulating the thickness of the particle layer.

The charging blade 18B has a function of regulating the layer thickness of the ink absorbing particles 16 on the surface of the supply roll 18A, and may change the layer thickness of the ink absorbing particles 16 on the surface of the supply roll 18A. For example, the charging blade 18B may regulate the layer thickness of the ink absorbing particles 16 on the surface of the supply roll 18A by varying the pressure onto the supply roll 18A. For example, by forming a single layer of the ink absorbing particles 16 on the surface of the supply roll 18A, the layer of the ink absorbing particles 16 on the surface of the intermediate transfer member 12 may be made in the form of a single layer. Alternatively, by setting the pressing force of the charging blade 18B to a low level, the thickness of the layer of the ink absorbing particles 16 formed on the surface of the supplying roll 18A may be increased, and thus the thickness of the ink absorbing particle layer formed on the surface of the intermediate transfer member 12 may be increased.

A method can also be mentioned in which, for example, when the peripheral speed of the supply roll 18A and the intermediate transfer member 12 are defined as 1 respectively, at which a single particle layer is formed on the surface of the intermediate transfer member 12, the thickness of the ink absorbing particle layer on the intermediate transfer member 12 may be increased by increasing the peripheral speed of the supply roll 18A to increase the amount of ink absorbing particles 16 supplied onto the intermediate transfer member 12. Further, the layer thickness may be regulated by combining the above methods. In this configuration, for example, the ink absorbing particles 16 are negatively charged, and the surface of the intermediate transfer member 12 is positively charged.

By controlling the layer thickness of the ink absorbing particle layer in such a manner, a pattern having a protective layer covering the surface of the pattern may be formed with reduced consumption of ink absorbing particles.

The charging roll in the charging device 28 may be a bar- or pipe-shaped member made of aluminum, stainless steel or the like having an elastic layer formed on the outer peripheral surface thereof, the elastic layer containing a conductivity-imparting material dispersed therein, and the roll having a diameter of from 10 mm to 25 mm and a volume resistivity that is controlled to be about from $10^6$ Ω·cm to about $10^8$ Ω·cm.

The elastic layer may include a polymer material such as urethane polymer, thermoplastic elastomer, epichlorohydrin rubber, ethylene-propylene-diene copolymer rubber, silicone type rubber, acrylonitrile-butadiene copolymer rubber, or polynorbornene rubber. These polymer materials may be used singly, or in combination of two or more thereof. A urethane foam polymer is preferably used.

The urethane foam polymer may be a urethane polymer containing a hollow material, such as hollow glass beads or thermally expandable microcapsules, mixed and dispersed therein to have a closed-cell structure.

Further, the surface of the elastic layer may be coated with a water-repellent coating layer with a thickness of from 5 μm to 100 μm.

The charging device 28 is connected to a DC power source, and the driven roll 31 is electrically connected to the frame ground. The charging device 28 is driven while holding the intermediate transfer member 12 between the charging device 28 and the driven roll 31, and a predetermined potential difference is generated between the charging device 28 and the grounded driven roll 31 at the pressing site.

Marking Process

An image is formed by ejecting the ink droplets 20A from the inkjet recording head 20 onto the layer of the ink absorbing particles 16 (ink absorbing particle layer 16A) which has been formed on the surface of the intermediate transfer member 12, according to an image signal. The ink droplets 20A are ejected onto the ink absorbing particle layer 16A from the inkjet recording head 20, and are rapidly absorbed by voids among/within the ink absorbing particles 16, while the colorant (such as a pigment) is trapped on the surface of the ink absorbing particles 16 or in the voids among/within the ink absorbing particles 16.

In this case, it is preferred that a large amount of the colorant (such as a pigment) is trapped on the surface of the ink absorbing particle layer 16A. The voids among/within the ink absorbing particles 16 exhibit a filter effect so that the colorant (such as a pigment) is trapped on the surface of ink absorbing particle layer 16A, and is trapped and fixed in the voids among/within the ink absorbing particles 16.

In order to ensure the trapping of the colorant (such as a pigment) on the surface of the ink absorbing particle layer 16A and in the voids among/within the ink absorbing particles 16, a method may be applied in which the ink is allowed to react with the ink absorbing particles 16 to rapidly insolubilize (aggregate) the colorant (such as a pigment). Specifically, a reaction between the ink and a polyvalent metal salt or a pH reaction type may be applied to the above reaction.

The inkjet recording head is preferably a line-type inkjet recording head having a width equal to or larger than the width of the recording medium. However, an image may alternatively be formed on a particle layer formed on an intermediate transfer member in a sequential manner using a conventional scanning-type inkjet recording head. The ink ejecting unit of the inkjet recording head 20 is not particularly limited as long as it is capable of ejecting ink, such as piezoelectric element-driving type, or heating element-driving type.

When reacting the ink absorbing particles 16 with an ink, the ink absorbing particles 16 may be treated with an aqueous solution containing a coagulant (for example, a polyvalent metal salt or an organic salt) having an effect of coagulating a pigment by the reaction of the coagulant with the ink, and dried.

Transfer Process

The ink absorbing particle layer 16A having absorbed the ink droplets 20A that form an image is transferred and fixed onto the recording medium 8 so that the image is formed on the recording medium 8. The transfer and fixing may be done in separate processes. The transfer and the fixing may be performed separately, but are preferably performed substantially simultaneously. The fixing may be performed by a method of heating the ink absorbing particle layer 16A or a method of pressing it, or a method including both heating and pressing, but is preferably a method of performing heating and pressing substantially simultaneously.

By controlling the heating and/or pressing, physical properties and glossiness at the surface of the ink absorbing particle layer 16A may be controlled. After the heating and/or pressing, the recording medium 8 having the image (ink absorbing particle layer 16A) transferred thereon may be separated from the intermediate transfer member 12 after cooling the ink absorbing particle layer 16A. The cooling may be performed by natural cooling or forced cooling such as air cooling. For these processes, the intermediate transfer member 12 may be in the form of a belt.

The ink image may be formed on a surface part of the layer of the ink absorbing particles 16 formed on the intermediate transfer member 12 (the colorant (pigment) is trapped on the surface of the ink absorbing particle layer 16A) so that the ink image is protected by the particle layer 16C of the ink absorbing particles 16, when transferred onto the recording medium 8.

The liquid ink component (a solvent or a dispersion medium) that has been absorbed and retained by the layer of the ink absorbing particles 16 is maintained in the layer of the ink absorbing particles 16 even after the transfer and the fixing, and is then removed by natural drying.

Cleaning Process

In order to enable repeated use of the intermediate transfer member 12 by refreshing the surface thereof, a cleaning process for cleaning the surface by a cleaning device 24 may be performed. The cleaning device 24 is composed of a cleaning section and a particle transport and recovery section (not shown in the drawings). In the cleaning process, the residue of the ink absorbing particles 16 (residual ink absorbing particles 16D) remaining on the surface of the intermediate transfer member 12 and other contaminants adhering to the intermediate transfer member 12 (such as paper powder from the recording medium 8) are removed. The collected residual particles 16D may be reused.

Charge Erasing Process

The surface of the intermediate transfer member 12 may be subjected to charge erasing using the charge eraser 29, prior to forming the release layer 14A.

In the recording apparatus shown in FIG. 3 described above, the surface of the intermediate transfer member 12 is charged by the charging device 28 after supplying the release agent 14D from the release agent supplying device 14 to the surface of the intermediate transfer member 12 to form the release layer 14A. The ink absorbing particles 16 are then supplied from the particle supplying device 18 to the region of the intermediate transfer member 12 where the release layer 14A has been formed and charged, thereby forming a particle layer. Thereafter, ink droplets are ejected from the inkjet recording head 20 onto the particle layer to form an image, and the ink is absorbed by the ink absorbing particles 16. The recording medium 8 is then superposed onto the intermediate transfer member 12, pressed and heated by the transfer fixing device 22, and thus the ink absorbing particle layer is transferred and fixed onto the recording medium 8.

In the third exemplary embodiment, a full-color image is recorded on the recording medium 8 by selectively ejecting the ink droplets 20A of black, yellow, magenta and cyan from the ink jet recording heads 20, according to image data. However, such a method is not only related to the recording of characters or images on recording mediums The recording apparatus of third exemplary embodiment is also applicable to all kinds of liquid droplet ejection (spraying) apparatuses that are used in industrial fields.

EXAMPLES

Hereinafter, the invention will be explained with reference to examples in detail, but the invention is not limited to these examples.

Preparation of Ink Absorbing Particles

Polymer Solution A

A styrene-butyl acrylate-acrylic acid copolymer (weight average molecular weight (Mw) of 57,000) is dissolved in acetone, and neutralized with an aqueous sodium hydroxide solution to obtain a polymer solution A. The molar concentration of carboxylate as measured by the above-described method is $3.2\times10^{-3}$ mol/g.

Polymer Solution B

A styrene-butyl methacrylate-acrylic acid copolymer (weight average molecular weight (Mw) of 110,000) is dissolved in acetone, and neutralized with an aqueous sodium hydroxide solution to obtain a polymer solution B. The molar concentration of carboxylate is $3.6\times10^{-3}$ mol/g.

Polymer Solution C

A styrene-butyl acrylate-acrylic acid copolymer (weight average molecular weight (Mw) of 28,000) is dissolved in acetone, and neutralized with an aqueous sodium hydroxide solution to obtain a polymer solution C. The molar concentration of carboxylate is $2.3\times10^{-3}$ mol/g.

Polymer Solution D

A styrene-butyl acrylate-methacrylic acid copolymer (weight average molecular weight (Mw) of 220,000) is dissolved in acetone, and neutralized with an aqueous sodium hydroxide solution to obtain a polymer solution D. The molar concentration of carboxylate is $2.7\times10^{-3}$ mol/g.

Polymer Solution E

A styrene-2-ethylhexyl acrylate-acrylic acid copolymer (weight average molecular weight (Mw) of 80,000) is dissolved in acetone, and neutralized with an aqueous sodium hydroxide solution to obtain a polymer solution E. The molar concentration of carboxylate is $5.0\times10^{-3}$ mol/g.

Polymer Solution F

A Styrene-butyl acrylate-acrylic acid copolymer (weight average molecular weight (Mw) of 18,000) is dissolved in acetone, and neutralized with an aqueous sodium hydroxide solution to obtain a polymer solution F. The molar concentration of carboxylate is $1.8\times10^{-3}$ mol/g.

Polymer Solution G

A styrene-butyl acrylate-methacrylic acid copolymer (weight average molecular weight (Mw) of 47,000) is dissolved in acetone, and neutralized with an aqueous sodium hydroxide solution to obtain a polymer solution G. The molar concentration of carboxylate is $1.6\times10^{-3}$ mol/g.

Polymer Solution H

A styrene-butyl methacrylate-acrylic acid copolymer (weight average molecular weight (Mw) of 7,000) is dissolved in acetone, and neutralized with an aqueous sodium hydroxide solution to obtain a polymer solution H. The molar concentration of carboxylate is $1.2\times10^{-3}$ mol/g.

Polymer Solution I

A Styrene-butyl acrylate-acrylic acid copolymer (weight average molecular weight (Mw) of 15,000) is dissolved in acetone, and neutralized with an aqueous sodium hydroxide solution to obtain a polymer solution I. The molar concentration of carboxylate is $0.8\times10^{-3}$ mol/g.

Preparation of Ink

Preparation of Ink A

The following ink components are mixed and stirred, and then the mixture is filtrated using a membrane filter having a pore size of 5 μm to obtain an ink A.

Carbon black: 5 parts by weight

Styrene-acrylic acid polymer: 2 parts by weight

Glycerol: 17 parts by weight

Triethyleneglycol monobutyl ether: 8 parts by weight

Propylene glycol: 8 parts by weight

Surfactant (acetyleneglycol): 1 part by weight

NaOH solution: Appropriate amount

Water: balance (to adjust the total amount of the composition to 100 parts)

The obtained ink is adjusted to a pH of 8.8 using NaOH solution. The viscosity and the surface tension of the ink are 4.8 mPa·s and 32 mN/m, respectively.

Preparation of Ink B

The following ink components are mixed and stirred, and then the mixture is filtrated using a membrane filter having a pore size of 5 μm to obtain an ink B.

C. I. pigment Blue: 10 parts by weight

Styrene-methacrylic acid polymer: 4 parts by weight

Glycerol: 14 parts by weight

Diethyleneglycol monobutyl ether: 2 parts by weight

Isopropyl alcohol: 4 parts by weight

Surfactant (an ethylene oxide adduct of acetyleneglycol): 2 parts by weight

NaOH solution: Appropriate amount

Water: Balance (to adjust the total amount of the composition to 100 parts)

The obtained ink is adjusted to a pH of 10.5 using NaOH solution. The viscosity and the surface tension of the ink are 9.7 mPa·s and 33 mN/m, respectively.

Preparation of Ink C

The following ink components are mixed and stirred, and then the mixture is filtrated using a membrane filter having a pore size of 5 μm to obtain an ink C.

Carbon black: 5 parts by weight

Styrene-acrylic acid polymer: 2 parts by weight

Glycerol: 17 parts by weight

Triethyleneglycol monobutyl ether: 8 parts by weight

Propyleneglycol: 8 parts by weight

Surfactant (an ethylene oxide adduct of acetylene glycol): 1 part by weight

NaOH solution: Appropriate amount

Water: Balance (to adjust the total amount of the composition to 100 parts)

The obtained ink is adjusted to a pH of 7.2 using NaOH solution. The viscosity and the surface tension of the ink are 5.1 mPa·s and 32 mN/m, respectively.

Preparation of Ink D

The following ink components are mixed and stirred, and then the mixture is filtrated using a membrane filter having a pore size of 5 μm to obtain an ink D.

Carbon black: 5 parts by weight

Styrene-acrylic acid polymer: 2 parts by weight

Glycerol: 17 parts by weight

Triethyleneglycol monobutyl ether: 8 parts by weight

Propyleneglycol: 8 parts by weight

Surfactant (polyoxyethylene alkyl ether): 1 part by weight

NaOH solution: Appropriate amount

Water: Balance (to adjust the total amount of the composition to 100 parts)

The obtained ink is adjusted to a pH of 6.8 using NaOH solution. The viscosity and the surface tension of the ink are 5.4 mPa·s and 32 mN/m, respectively.

Examples 1 to 6 and Comparative Examples 1 to 8

Ink Absorbing Particles

Two kinds of polymer solutions are mixed in accordance with the combinations and the mixing ratios shown in Table 1. In Example 6 and Comparative Example 1, a single kind of polymer solution is used. Then, particles are formed from the solution by a spray-drying method, thereby providing ink absorbing particles.

With respect to the particles of Examples 2 and 3, the particles obtained above are further mixed with 0.5 weight % of silica particles (primary particle diameter of 16 nm, manufactured by Japan Aerosil Co.), and then stirred with a mixer, whereby ink absorbing particles are obtained.

Subsequently, the obtained ink is supplied in an amount of 10 g/m$^2$ onto the silicone sheet by an inkjet method at an image density of 1,200×1,200 dpi (number of dots per inch) at an ejection amount of 5 pl per drop to form a patch.

Plain paper (Trade name: C2 PAPER, manufactured by Fuji Xerox Co., Ltd.) is pressed against the ink absorbing particles, on which the patch is formed, under the conditions of temperature of 50° C. and pressure of 10$^3$ Pa. Then, the weight of residue remaining on the silicone sheet side is measured to thereby measure the transfer ratio.

Evaluation Criteria

A: 95 weight % or more of the ink absorbing particles is transferred.

B: The proportion of the transferred ink absorbing particles is 85 weight % or more but less than 95 weight %.

C: Less than 85 weight % of the ink absorbing particles is transferred.

TABLE 1

| | | Polymer 1 | | | Polymer 2 | | | Mixing ratio (weight ratio) | |
|---|---|---|---|---|---|---|---|---|---|
| | | Type | Mw | Molar concentration of carboxylate (mol/g) | Type | Mw | Molar concentration of carboxylate (mol/g) | Polymer 1 | Polymer 2 |
| Examples | 1 | A | 57,000 | $3.2 \times 10^{-3}$ | F | 18,000 | $1.8 \times 10^{-3}$ | 70 | 30 |
| | 2 | A | 57,000 | $3.2 \times 10^{-3}$ | G | 47,000 | $1.6 \times 10^{-3}$ | 80 | 20 |
| | 3 | B | 110,000 | $3.6 \times 10^{-3}$ | F | 18,000 | $1.8 \times 10^{-3}$ | 80 | 20 |
| | 4 | B | 110,000 | $3.6 \times 10^{-3}$ | G | 47,000 | $1.6 \times 10^{-3}$ | 50 | 50 |
| | 5 | D | 220,000 | $2.7 \times 10^{-3}$ | H | 7,000 | $1.2 \times 10^{-3}$ | 40 | 60 |
| | 6 | A | 57,000 | $3.2 \times 10^{-3}$ | — | — | — | 100 | — |
| Comparative Examples | 1 | — | — | — | H | 7,000 | $1.2 \times 10^{-3}$ | — | 100 |
| | 2 | C | 28,000 | $2.3 \times 10^{-3}$ | H | 7,000 | $1.2 \times 10^{-3}$ | 80 | 20 |
| | 3 | B | 110,000 | $3.6 \times 10^{-3}$ | H | 7,000 | $1.2 \times 10^{-3}$ | 20 | 80 |
| | 4 | D | 220,000 | $2.7 \times 10^{-3}$ | G | 47,000 | $1.6 \times 10^{-3}$ | 30 | 70 |
| | 5 | E | 80,000 | $5.0 \times 10^{-3}$ | F | 18,000 | $1.8 \times 10^{-3}$ | 90 | 10 |
| | 6 | F | 18,000 | $1.8 \times 10^{-3}$ | G | 47,000 | $1.6 \times 10^{-3}$ | 70 | 30 |
| | 7 | D | 220,000 | $2.7 \times 10^{-3}$ | I | 15,000 | $0.8 \times 10^{-3}$ | 20 | 80 |
| | 8 | A | 57,000 | $3.2 \times 10^{-3}$ | C | 28,000 | $2.3 \times 10^{-3}$ | 50 | 50 |

The obtained ink absorbing particles are measured for the following items according to the methods described above, and the results are shown in Table 2.

Particle diameter (sphere equivalent average particle diameter);

Minimum temperature Ts10b at which a needle enters to a depth of 10 μm by a TMA needle penetration method (Ts10b of bulk particle)

Minimum temperature Ts100w at which a needle enters to a depth of 100 μm by a TMA needle penetration method when an equivalent amount of water is absorbed (Ts100w of water absorbing particle)

Minimum temperature Ts400w at which a needle enters to a depth of 400 μm by a TMA needle penetration method when an equivalent amount of water is absorbed (Ts400w of water absorbing particle)

Minimum temperature Ts10d at which a needle enters to a depth of 10 μm by a TMA needle penetration method when an equivalent amount of water is absorbed, and then 70 weight % of the absorbed water is dried off (Ts10d of dry particle).

Evaluation

Transfer Properties

The ink absorbing particles are supplied onto a silicone sheet in an amount of 10 g/m$^2$.

Blocking

The fixability of the image is evaluated based on occurrence of blocking, according to the following method.

An image forming device manufactured by Fuji Xerox Co., Ltd., which is equipped with a piezo trial production recording head capable of ejecting ink at 2 pl per drop at an image density of 1,200 dpi×1,200 dpi (dpi: number of dots per inch), is used. The ink absorbing particles and the ink obtained in the above are respectively loaded into the image forming device.

The ink absorbing particles are supplied onto an intermediate transfer member at 10 g/m$^2$, and subsequently ink is applied to the ink absorbing particles by the image forming device to form a patch. Thereafter, the ink absorbing particles to which the ink has been applied are transferred from the intermediate transfer member to a recording medium (plain paper, trade name: C2 PAPER, manufactured by Fuji Xerox Co., Ltd.), and heated to 100° C. to fix the image. Thus, an image having a printed area and a non-printed area is formed. The printed area of the image is covered with blank paper for evaluation (trade name: C2 PAPER, manufactured by Fuji Xerox Co., Ltd.), and a 5 kg weight having a base area of 10 cm$^2$ is placed thereon. Then, this is allowed to stand at 25° C. for 1 day. Thereafter, evaluation is performed according to the following evaluation criteria.

A: The ink does not transfer to the blank paper covering the printed area, and the blank paper covering the printed area and the recording medium do not adhere to each other.

B: Although the ink does not transfer to the blank paper covering the printed area, the blank paper covering the printed area and the recording medium adhere to each other.

C: The ink transfers to the blank paper covering the printed area, and the blank paper covering the printed area and the recording medium adhere to each other.

Liquid Absorption Time

Liquid absorption time of the ink absorbing particles is evaluated by the following method.

The ink absorbing particles are sprayed onto a PFA film (30 $g/m^2$ of particles). Ink is applied at 2 pl per drop at an image density of 1,200 dpi×1,200 dpi using an inkjet method to form a 100% coverage pattern. Subsequently, after a certain (natural) drying time from the application of the ink, plain paper (trade name: C2 PAPER, manufactured by Fuji Xerox Co., Ltd.) is pressed against the image surface at a pressure of $10^5$ Pa. The minimum drying time required for avoiding ink transfer to the plain paper is measured.

A: The minimum drying time is less than 0.25 seconds.

B: The minimum drying time is 0.25 seconds or more but less than 0.75 seconds.

C: The minimum drying time is 0.75 seconds or more.

3. The ink absorbing particle of claim 1, wherein the ink absorbing particle containing a polymer (A) and a polymer (B), the polymer (A) having a weight average molecular weight of about 30,000 to about 200,000, and the polymer (B) having a weight average molecular weight of about 10,000 to about 50,000 but having a lower weight average molecular weight than the polymer (A).

4. The ink absorbing particle of claim 3, wherein the polymer (A) includes a carboxylate at a molar concentration of from about $2.1\times10^{-3}$ mol/g to about $4.5\times10^{-3}$ mol/g and the polymer (B) includes a carboxylate at a molar concentration of from about $1.0\times10^{-3}$ mol/g to about $2.1\times10^{-3}$ mol/g but at a lower molar concentration than that of the carboxylate in the polymer (A).

5. The ink absorbing particle of claim 3, wherein the mixing ratio of a particle comprising the polymer (A) to a particle comprising the polymer (B) (weight ratio) is from about 10:90 to about 90:10.

6. The ink absorbing particle of claim 1, wherein the ink absorbing particle contains a polymer (a) and a polymer (b), the polymer (a) including a carboxylate at a molar concentration of from about $2.1\times10^{-3}$ mol/g to about $4.5\times10^{-3}$ mol/g and the polymer (b) including a carboxylate at a molar concentration of from about $1.0\times10^{-3}$ mol/g to about $2.1\times10^{-3}$

TABLE 2

| | | Polymer type | | Particle diameter | Bulk particle Ts10b | Water absorbing particle Ts100w | Water absorbing particle Ts400w | (Ts400w − Ts100w) | Dry particle Ts10d | Evaluation: Transfer property | | Evaluation: Blocking | Evaluation: Liquid absorption rate |
|---|---|---|---|---|---|---|---|---|---|---|---|---|---|
| | | 1 | 2 | (μm) | (° C.) | (° C.) | (° C.) | Ts100w) | (° C.) | | (%) | | |
| Examples | 1 | A | F | 6 | 120 | 25 | 60 | 35 | 70 | A | 98 | A | A |
| | 2 | A | G | 7 | 120 | 30 | 60 | 30 | 75 | A | 98 | A | A |
| | 3 | B | F | 10 | 110 | 35 | 70 | 35 | 90 | B | 94 | A | A |
| | 4 | B | G | 5 | 110 | 40 | 75 | 35 | 80 | B | 90 | A | A |
| | 5 | D | H | 12 | 90 | 40 | 80 | 40 | 100 | B | 87 | A | B |
| | 6 | A | — | 6 | 120 | 35 | 50 | 15 | 80 | B | 93 | A | B |
| Comparative Examples | 1 | — | H | 8 | 75 | 20 | 25 | 5 | 30 | C | 81 | C | C |
| | 2 | C | H | 10 | 95 | 20 | 35 | 15 | 40 | C | 75 | C | C |
| | 3 | B | H | 10 | 90 | 20 | 30 | 10 | 55 | C | 77 | B | C |
| | 4 | D | G | 6 | 110 | 50 | 85 | 35 | 110 | C | 80 | A | B |
| | 5 | E | F | 7 | 160 | 60 | 110 | 50 | 130 | C | 60 | A | C |
| | 6 | F | G | 11 | 160 | 80 | 120 | 40 | 120 | C | 50 | A | C |
| | 7 | D | I | 7 | 110 | 60 | 90 | 30 | 80 | C | 73 | A | C |
| | 8 | A | C | 10 | 100 | 20 | 45 | 20 | 50 | C | 83 | B | A |

What is claimed is:

1. An ink absorbing particle to absorb an ink, the ink absorbing particle comprising a polymer and having, in a TMA needle penetration, a minimum temperature Ts10b of from about 80° C. to about 150° C. at which a needle enters to a depth of 10 μm, a minimum temperature Ts100w of about 40° C. or lower at which a needle enters to a depth of 100 μm when an equivalent amount of water is absorbed, and a minimum temperature Ts400w of about 50° C. or higher at which a needle enters to a depth of 400 μm when an equivalent amount of water is absorbed.

2. The ink absorbing particle of claim 1, wherein the ink absorbing particle in a TMA needle penetration having a minimum temperature Ts10d of about 50° C. or higher at which a needle enters to a depth of 10 μm when an equivalent amount of water is absorbed, and then 70 weight % of the absorbed water is dried off.

mol/g but at a lower molar concentration than that of the carboxylate in the polymer (a).

7. The ink absorbing particle of claim 6, wherein the mixing ratio of an ink absorbing particle containing the polymer (a) to an ink absorbing particle containing the polymer (b) (weight ratio) is from about 10:90 to about 90:10.

8. A set of materials for recording, comprising an ink and ink absorbing particles, the ink absorbing particles including a polymer and having, in a TMA needle penetration, a minimum temperature Ts10b of from about 80° C. to about 150° C. at which a needle enters to a depth of 10 μm, a minimum temperature Ts100w of about 40° C. or lower at which a needle enters to a depth of 100 μm when an equivalent amount of water is absorbed, and a minimum temperature Ts400w of about 50° C. or higher at which a needle enters to a depth of 400 μm when an equivalent amount of water is absorbed.

9. The set of materials for recording of claim 8, wherein the ink absorbing particles in a TMA needle penetration have a minimum temperature Ts10d of about 50° C. or higher at which a needle enters to a depth of 10 μm when an equivalent amount of water is absorbed, and then 70 weight % of the absorbed water is dried off.

10. The set of materials for recording of claim 8, wherein the ink absorbing particles contain a polymer (A) having a weight average molecular weight of about 30,000 to about 200,000 and a polymer (B) having a weight average molecular weight of about 10,000 to about 50,000 but having a lower weight average molecular weight than the polymer (A).

11. The set of materials for recording of claim 10, wherein the polymer (A) includes a carboxylate at a molar concentration of from about $2.1\times10^{-3}$ mol/g to about $4.5\times10^{-3}$ mol/g and the polymer (B) includes a carboxylate at a molar concentration of from about $1.0\times10^{3}$ mol/g to about $2.1\times10^{-3}$ mol/g but at a lower molar concentration than that of the carboxylate in the polymer (A).

12. The set of materials for recording of claim 8, wherein ink absorbing particles contain a polymer (a) including a carboxylate at a molar concentration of from about $2.1\times10^{-3}$ mol/g to about $4.5\times10^{-3}$ mol/g and a polymer (b) including a carboxylate at a molar concentration of from about $1.0\times10^{-3}$ mol/g to about $2.1\times10^{-3}$ mol/g but at a lower molar concentration than that of the carboxylate in the polymer (a).

* * * * *